US012664739B2

(12) United States Patent　　(10) Patent No.:　US 12,664,739 B2
Kajita　　(45) Date of Patent:　Jun. 23, 2026

(54) HEAD-MOUNTED DISPLAY APPARATUS THAT CONTROLS EXPOSURE TIMINGS OF PLURALITY OF IMAGING UNITS

(71) Applicant: CANON KABUSHIKI KAISHA, Tokyo (JP)

(72) Inventor: Yoshiki Kajita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 18/528,608

(22) Filed: Dec. 4, 2023

(65) Prior Publication Data

US 2024/0185543 A1　Jun. 6, 2024

(30) Foreign Application Priority Data

Dec. 6, 2022　(JP) ................................. 2022-195010

(51) Int. Cl.
| | |
|---|---|
| *G06T 19/00* | (2011.01) |
| *G02B 27/01* | (2006.01) |
| *G06F 3/01* | (2006.01) |
| *G06T 5/50* | (2006.01) |
| *G06V 10/25* | (2022.01) |
| *G06V 10/44* | (2022.01) |

(52) U.S. Cl.
CPC ........ *G06T 19/006* (2013.01); *G02B 27/0172* (2013.01); *G06F 3/013* (2013.01); *G06T 5/50* (2013.01); *G06V 10/25* (2022.01); *G06V 10/44* (2022.01); *G06T 2207/20221* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 2013/0162881 A1 * | 6/2013 | Sengoku | .............. | H04N 23/951 |
| | | | | 348/333.11 |
| 2013/0329127 A1 | 12/2013 | Hataguchi | | |
| 2017/0324899 A1 | 11/2017 | Ohba | | |
| 2020/0177828 A1 * | 6/2020 | Seki | ........................ | G03B 13/02 |
| 2021/0231950 A1 * | 7/2021 | Kajita | .................... | H04N 23/73 |
| 2023/0319407 A1 * | 10/2023 | Kaji | ................... | H04N 23/6811 |
| 2025/0220300 A1 * | 7/2025 | Tong | ....................... | H04N 23/71 |

FOREIGN PATENT DOCUMENTS

| | | | | |
|---|---|---|---|---|
| JP | 2000341719 A | | 12/2000 | |
| JP | 2001359129 A | * | 12/2001 | |
| JP | 2006005608 A | | 1/2006 | |
| JP | 2017142294 A | | 8/2017 | |
| JP | 2021190757 A | | 12/2021 | |
| WO | WO-2021257172 A1 | * | 12/2021 | ......... G02B 27/0172 |

* cited by examiner

*Primary Examiner* — Jwalant Amin

(74) *Attorney, Agent, or Firm* — Canon U.S.A., Inc. IP Division

(57)　　　　ABSTRACT

A head-mounted display apparatus includes a display unit, a first imaging unit, a second imaging unit, and a generation unit configured to, based on a signal indicating an image input timing of input of an image to the display unit, generate a first signal for controlling a start of exposure of the first imaging unit and a second signal for controlling a start of exposure of the second imaging unit.

20 Claims, 16 Drawing Sheets

DISPLAY UNIT/DETECTION UNIT

FIG.14

HEAD-MOUNTED DISPLAY APPARATUS THAT CONTROLS EXPOSURE TIMINGS OF PLURALITY OF IMAGING UNITS

BACKGROUND

Field of the Disclosure

The present disclosure relates to a head-mounted display apparatus that controls the exposure timings of a plurality of imaging units.

Description of the Related Art

The mixed reality (so-called MR) technology has been known as a technique for seamlessly blending the real world and the virtual world in real time in recent years. As one of the MR techniques, there is an MR system using a video see-through head-mounted display (HMD: hereinafter, referred to as an HMD, where necessary). In the MR system, an image of an object that approximately matches the object observed from the pupil positions of a wearer of an HMD is captured by an imaging unit mounted in the HMD, and an image obtained by displaying computer graphics (CG) in a superimposed manner on the captured image is presented to the wearer of the HMD. This enables the wearer of the HMD to experience an MR space.

The MR system obtains the position and orientation of its HMD through a calculation process using a captured image and information regarding various sensors. It is desirable that the imaging unit and the various sensors operate in synchronization, wherever possible. For example, Japanese Patent Application Laid-Open No. 2000-341719 discusses a technique for supplying common driving signals and synchronization signals to a plurality of imaging units to make the plurality of imaging units in synchronization with each other. Japanese Patent Application Laid-Open No. 2006-005608 discusses a technique for aligning the centroids of the exposure times among a plurality of imaging units with different lengths of exposure time from each other to make the plurality of imaging units in synchronization with each other.

The techniques of Japanese Patent Application Laid-Open No. 2000-341719 and Japanese Patent Application Laid-Open No. 2006-005608, however, have the following issue. The configurations of Japanese Patent Application Laid-Open No. 2000-341719 and Japanese Patent Application Laid-Open No. 2006-005608 are limited to synchronization between imaging units. In a system that handles various sensors in addition to imaging units as with the MR system, operations out of synchronization between the imaging units and the various sensors could lead to insufficient calculation accuracy. In this case, a positional shift may occur between the captured image and the CG. Moreover, operations out of synchronization between a display unit and the imaging units would result in variations in delay time from the capturing of an image to the display of the image in each frame, or bring about a redundant or missing frame in a long-second cycle, which can give a feeling of discomfort to the wearer of the HMD.

SUMMARY

According to an aspect of the present disclosure, a head-mounted display apparatus includes a display unit, a first imaging unit, a second imaging unit, and a generation unit configured to, based on a signal indicating an image input timing of input of an image to the display unit, generate a first signal for controlling a start of exposure of the first imaging unit and a second signal for controlling a start of exposure of the second imaging unit.

Further features of the present disclosure will become apparent from the following description of exemplary embodiments with reference to the attached drawings.

BRIEF DESCRIPTION OF THE DRAWINGS

FIG. 14 is a diagram illustrating an example of setting of a synchronization reference timing.

DESCRIPTION OF THE EMBODIMENTS

Figure 1:
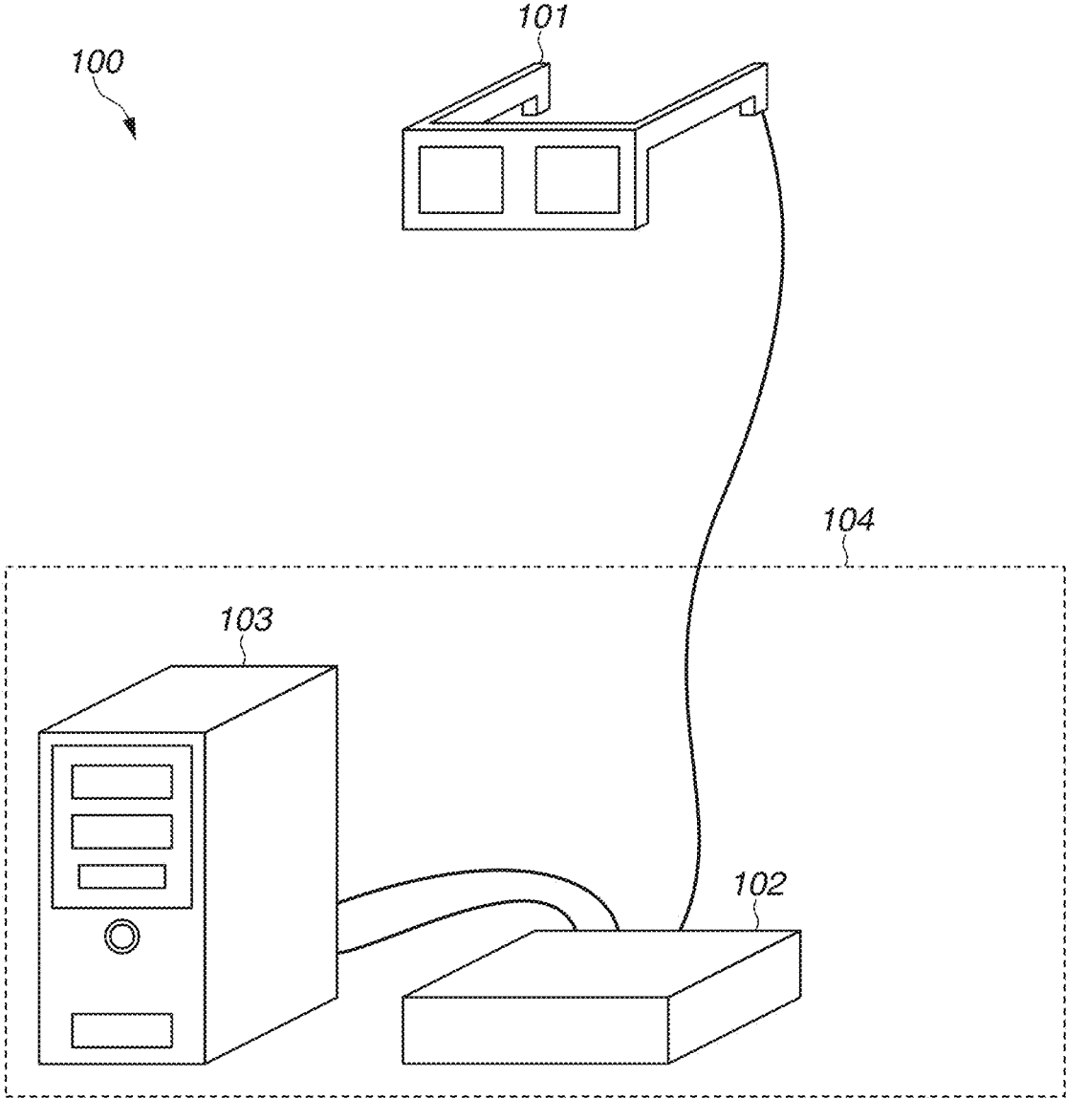
FIG. 1 is a diagram illustrating an example of a configuration of a mixed reality (MR) system.

Exemplary embodiments will be described in detail below with reference to the drawings. The following exemplary embodiments do not limit the appended claims. Although a plurality of features is described in the exemplary embodiments, not all the plurality of features is used, and any combination of the plurality of features may be made. Further, in the drawings, like numbers refer to like or similar components, and a redundant description will be omitted.

A first exemplary embodiment will be described. FIG. 1 is a diagram illustrating an example of the configuration of a mixed reality (MR) system 100 according to the first exemplary embodiment. The MR system 100 includes a head-mounted display (HMD) 101 and an image processing apparatus 104. The HMD 101 is an example of a head-mounted display apparatus. The image processing apparatus 104 includes a computer apparatus 103 and a controller 102. The computer apparatus 103 generates an image of a mixed reality space (a space obtained by fusing a real space and a virtual space) to be displayed on the HMD 101. The controller 102 mediates between the HMD 101 and the computer apparatus 103.

Figure 16A:
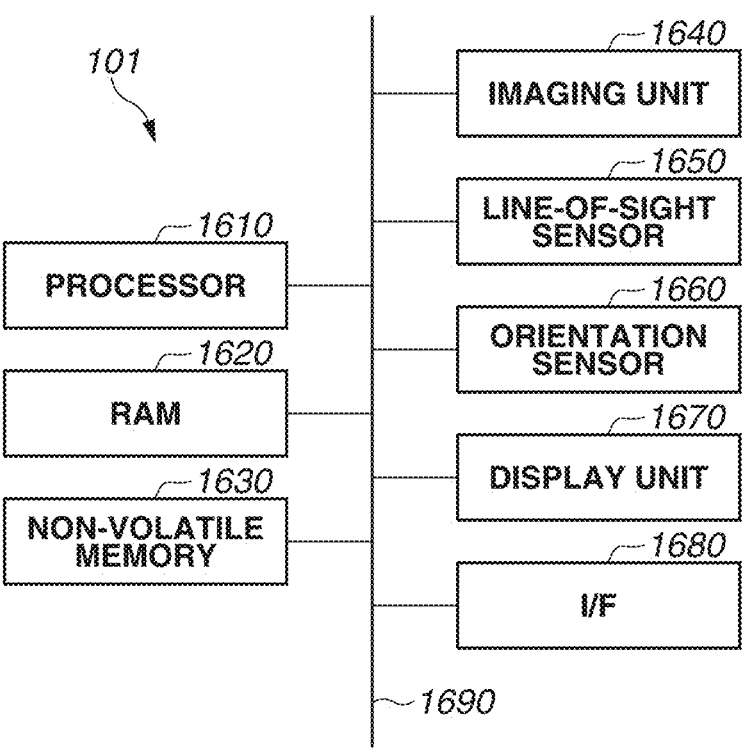
FIG. 16A is a block diagram illustrating an example of a hardware configuration of a head-mounted display (HMD).

First, the HMD 101 will be described. As illustrated in FIG. 16A, the HMD 101 includes an imaging unit 1640 that captures images of the real space, an orientation sensor 1660 that measures (performs a measurement process on) the position and orientation of the HMD 101, and a display unit 1670 that displays images of the mixed reality space transmitted from the image processing apparatus 104. The HMD 101 also functions as a synchronization control apparatus for these plurality of devices. The HMD 101 transmits a captured image captured by the imaging unit 1640 and the position and orientation of the HMD 101 measured by the orientation sensor 1660 to the controller 102. The HMD 101 also receives an image of the mixed reality space generated by the computer apparatus 103 based on the transmitted captured image and position and orientation from the controller 102 and displays the received image of the mixed reality space on the display unit 1670. Thus, the image of the mixed reality space is presented before the eyes of a user wearing the HMD 101 on his or her head.

The HMD 101 may operate on a power supply voltage supplied from the controller 102, or may operate on a power supply voltage supplied from a battery included in the HMD 101. That is, the method for supplying a power supply voltage to the HMD 101 is not limited to a particular method.

In FIG. 1, the HMD 101 and the controller 102 are connected together by wire. The connection form between the HMD 101 and the controller 102, however, is not limited to a wired connection, and may be a wireless connection, or may be the combination of wireless and wired connections. That is, the connection form between the HMD 101 and the controller 102 is not limited to a particular connection form.

Next, the controller 102 will be described. The controller 102 performs a variety of types of image processing (resolution conversion, color space conversion, distortion correction of an optical system of the imaging unit 1640 included in the HMD 101, and encoding) on a captured image transmitted from the HMD 101. Then, the controller 102 transmits the captured image subjected to the image processing and a position and orientation transmitted from the HMD 101 to the computer apparatus 103. The controller 102 also performs similar image processing on an image of the mixed reality space transmitted from the computer apparatus 103 and transmits the image of the mixed reality space to the HMD 101.

Next, the computer apparatus 103 will be described. Based on a captured image and a position and orientation received from the controller 102, the computer apparatus 103 obtains the position and orientation of the HMD 101 (the position and orientation of the imaging unit 1640 included in the HMD 101) and generates an image of the virtual space viewed from an eyepoint with the obtained position and orientation. Then, the computer apparatus 103 generates a combined image (an image of the mixed reality space) of the image of the virtual space and the captured image transmitted from the HMD 101 via the controller 102 and transmits the generated combined image to the controller 102.

Figure 2:
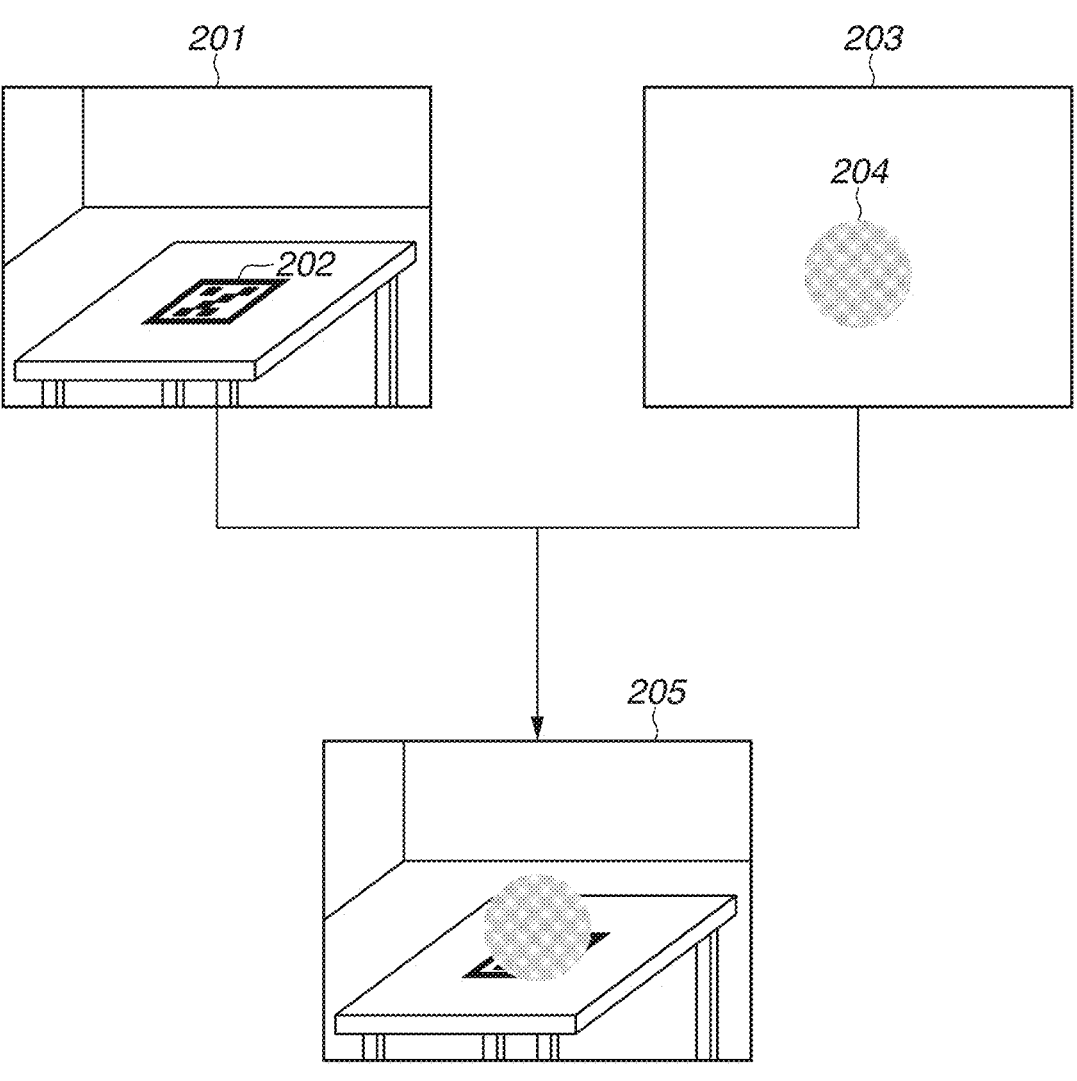
FIG. 2 is a diagram illustrating a process of generating a combined image.

FIG. 2 is a diagram illustrating the process of generating a combined image 205 from a captured image 201 and an image 203 of the virtual space. A captured image 201 includes a marker 202 artificially placed in the real space (although the number of markers is one in FIG. 2 for ease of description, in fact, a plurality of markers is included). The computer apparatus 103 extracts the marker 202 from the captured image 201, and based on the extracted marker 202 and a position and orientation received from the controller 102, obtains the position and orientation of the HMD 101. Then, the computer apparatus 103 generates an image 203 of the virtual space viewed from an eyepoint with the obtained position and orientation. The image 203 includes a virtual object 204. Then, the computer apparatus 103 generates an image 205 of the mixed reality space, which is a combined image obtained by combining the captured image 201 and the image 203 of the virtual space, and transmits the generated image 205 to the HMD 101. When the captured image 201 and the image 203 of the virtual space are combined together, information regarding depth in the three-dimensional space or information regarding the transparency of the virtual object 204 is used, allowing a combined image to be generated in view of the fore-and-aft relationship between the real object and the virtual object 204 or a combined image obtained by combining a translucent virtual object.

Although the computer apparatus 103 and the controller 102 are separate apparatuses in FIG. 1, the computer apparatus 103 and the controller 102 may be integrated together. In the present exemplary embodiment, a form will be described in which the computer apparatus 103 and the controller 102 are integrated together. In the following description, an apparatus obtained by integrating the computer apparatus 103 and the controller 102 is the image processing apparatus 104.

The HMD 101 includes the imaging unit 1640. The imaging unit 1640 can appropriately use an imaging sensor using a rolling shutter method and an imaging sensor using a global shutter method in view of a variety of factors, such as the number of pixels, image quality, noise, the sensor size, power consumption, and cost, or can use these imaging sensors in combination according to the purpose. For example, a configuration can be used in which the imaging sensor using the rolling shutter method, which is capable of acquiring an image with higher image quality, is used to capture the captured image 201 to be combined with the image 203 of the virtual space, and the imaging sensor using the global shutter method, which does not cause image distortion, is used to capture the marker 202. The image distortion refers to a phenomenon that occurs due to the operating principle of the rolling shutter method, where an exposure process is sequentially started on each line in the scanning direction.

Figure 3:
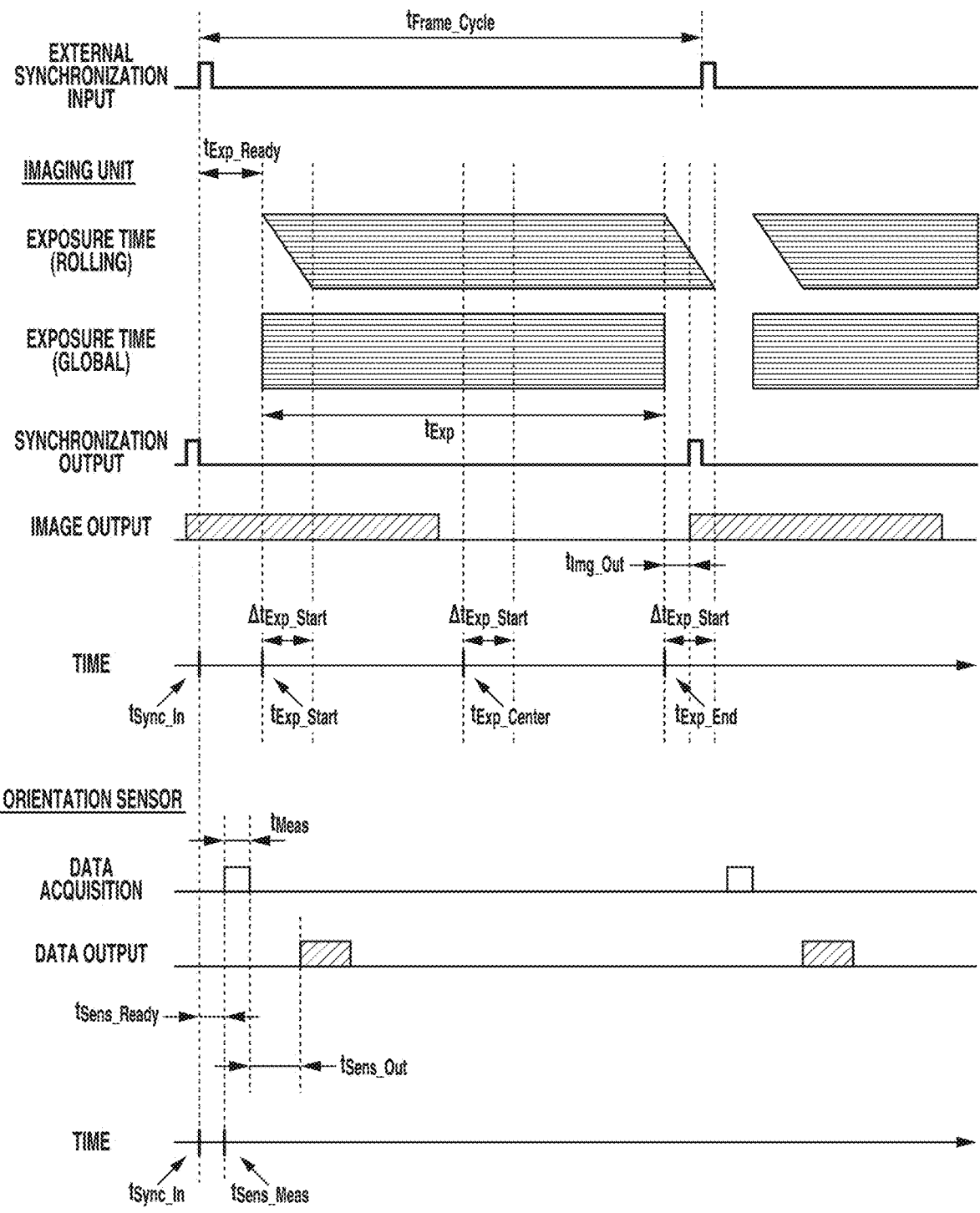
FIG. 3 is a diagram illustrating operation timings of an imaging unit and an orientation sensor.

Specifically, the image distortion is known as a phenomenon where, as illustrated in FIG. 3, temporal shifts occur between the exposure timings of lines, whereby, as the imaging unit 1640 or an object moves during the exposure time, the object is recorded in a flowingly deformed manner. In FIG. 3, the horizontal axis represents time, and "exposure time (rolling)" indicates the exposure time of lines in capture by the imaging sensor using the rolling shutter method. "Exposure time (global)" indicates the exposure time of lines in capture by the imaging sensor using the global shutter method. In the global shutter method, an exposure process is simultaneously performed on all the lines, which does not cause temporal shifts between the exposure timings of the lines, with no image distortion occurring.

As illustrated in FIG. 3, if the imaging unit 1640 receives an external synchronization input (an external synchronization input signal), then after a processing time $t_{Exp\_Ready}$ until the start of exposure, the imaging unit 1640 starts exposing pixels. During an exposure time $t_{Exp}$ set for the imaging unit 1640, the pixels are exposed. After a time $t_{Img\_out}$ from the end of the exposure of the lines, the imaging unit 1640 starts outputting a synchronization signal (a synchronization output or a synchronization output signal) and an image signal (an image output). With the imaging sensor using the global shutter method, the time from a time $t_{Sync\_In}$ when the external synchronization input is input to an exposure start time $t_{Exp\_Start}$, an exposure center time $t_{Exp\_Center}$, and an exposure end time $t_{Exp\_End}$ are uniquely determined as unique values for each imaging sensor.

On the other hand, with the imaging sensor using the rolling shutter method, depending on which line is selected so as to use the exposure time on the selected line as a reference, the exposure start time $t_{Exp\_Start}$, the exposure center time $t_{Exp\_Center}$, and the exposure end time $t_{Exp\_End}$ can take different values in a range corresponding to a difference $\Delta t_{Exp\_Start}$ between the exposure start timings of the first line and the last line.

Similarly, if the orientation sensor 1660, which measures the position and orientation of the HMD 101, receives the external synchronization input, then after a processing time $t_{Sens\_Ready}$ until the start of measurement, the orientation sensor 1660 starts measuring the position and orientation (data acquisition). Then, after a time $t_{Sens\_Out}$ from the end of the measurement, the orientation sensor 1660 starts outputting the position and orientation (data output).

Figure 5:
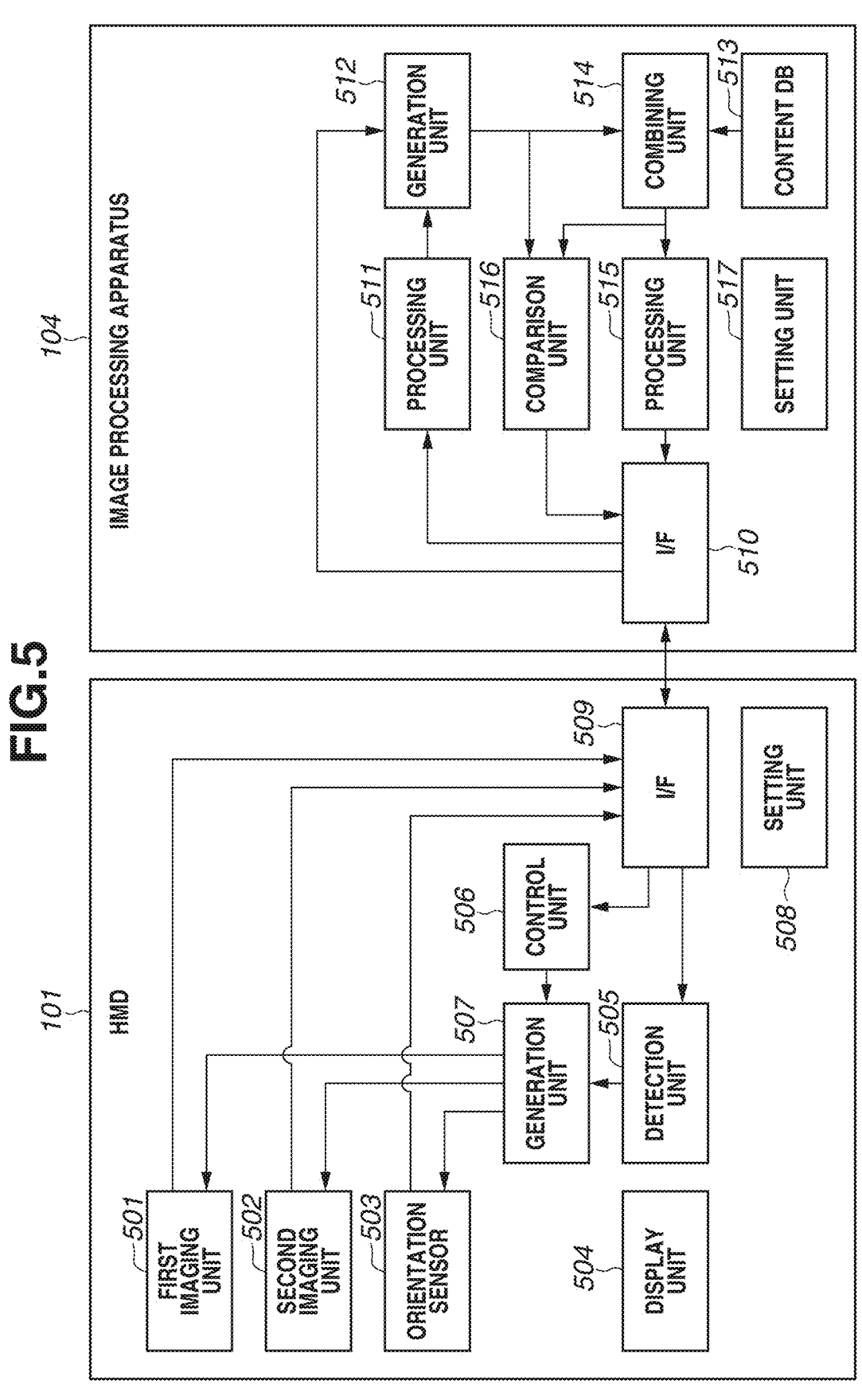
FIG. 5 is a block diagram illustrating an example of functional configurations.

FIG. 5 illustrates an example of a functional configuration of the HMD 101. The HMD 101 includes a first imaging unit 501, a second imaging unit 502, an orientation sensor 503, and a display unit 504. The first imaging unit 501 corresponds to the imaging sensor that captures an image using the rolling shutter method in the imaging unit 1640 in FIG. 16A. The second imaging unit 502 corresponds to the imaging sensor that captures an image using the global shutter method in the imaging unit 1640 in FIG. 16A. The orientation sensor 503 corresponds to the orientation sensor 1660 in FIG. 16A. The display unit 504 corresponds to the display unit 1670 in FIG. 16A.

Figure 4:
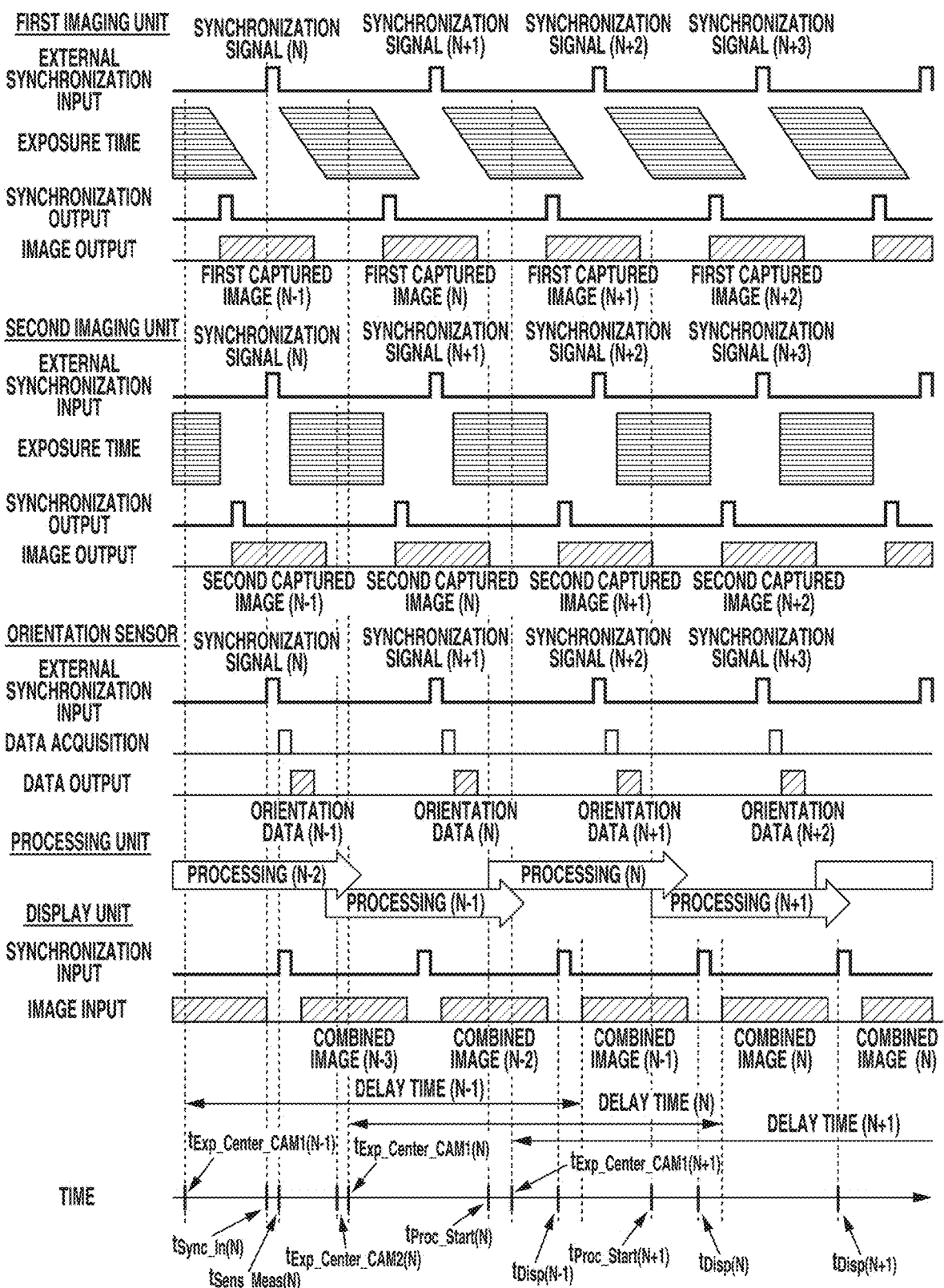
FIG. 4 is a diagram illustrating delay variation due to asynchronous operations.

FIG. 4 is a diagram illustrating delay variation due to synchronous operations of the first imaging unit 501, the second imaging unit 502, and the orientation sensor 503 based on external synchronization inputs and an asynchronous operation of the display unit 504. In FIG. 4, common external synchronization inputs are provided to the first imaging unit 501 using the rolling shutter method, second imaging unit 502 using the global shutter method, and the orientation sensor 503, thereby synchronizing these devices. As described with reference to FIG. 3, the first imaging unit 501, the second imaging unit 502, and the orientation sensor 503 each have unique processing times. Thus, with respect to synchronization signals (N) provided at a time $t_{Sync\_In(N)}$, shifts occur between the times when exposure processes are actually performed on the first imaging unit 501 and the second imaging unit 502 and the time when the orientation sensor 503 performs measurement. For example, a case will be described where the exposure center times of the first imaging unit 501 and the second imaging unit 502 are considered to be references. In this case, the time when the orientation sensor 503 measures the position and orientation is $t_{Sens\_Meas(N)}$, the exposure center time of the first imaging unit 501 is $t_{Exp\_Center\_CAM1(N)}$, and the exposure center time of the second imaging unit 502 is $t_{Exp\_Center\_CAM2(N)}$. These times do not coincide with each other.

A configuration will be described in which the first imaging unit 501 is used to acquire the captured image 201 to be combined with the image 203 of the virtual space, and the second imaging unit 502 is used to capture the marker 202. The image 203 of the virtual space is generated based on the captured image 201 of the marker 202 acquired by the second imaging unit 502 and the position and orientation acquired by the orientation sensor 503, which causes the effect of an error due to a shift between the acquisition timings of the captured image 201 of the marker 202 and the position and orientation. The acquisition timing of the captured image 201 acquired by the first imaging unit 501 is also different from the acquisition timing of the captured image 201 captured by the second imaging unit 502 and the acquisition timing of the position and orientation acquired by the orientation sensor 503, causing an increased effect on the positional accuracy of the image 203 of the virtual space superimposed on the captured image 201. Thus, it is desirable that in the MR system 100, the first imaging unit 501, the second imaging unit 502, and the orientation sensor 503 perform their synchronous operations so that the exposure timing of the first imaging unit 501, the exposure timing of the second imaging unit 502, and the acquisition timing of the position and orientation acquired by the orientation sensor 503 coincide with each other with higher accuracy.

A time $t_{Proc\_Start(N)}$ is the time when, based on synchronization signals (N), a first captured image (N) acquired by the first imaging unit 501, a second captured image (N) acquired by the second imaging unit 502, and orientation data (N) acquired by the orientation sensor 503 are gathered. At the time $t_{Proc\_Start(N)}$, processing (N) is started by processing units. This processing is processing, such as captured image processing, position/orientation information generation, and image combining in the MR system 100. A combined image (N) generated by the processing (N) is displayed on the display unit 504 operating asynchronously with the first imaging unit 501, the second imaging unit 502, and the orientation sensor 503, based on a synchronization signal input to the display unit 504 at a time $t_{Disp(N)}$.

The time from the exposure center time $t_{Exp\_Center\_CAM1(N)}$ when the first imaging unit 501 acquires the first captured image (N) to the time $t_{Disp(N)}$ when the combined image (N) is displayed on the display unit 504 is a delay time (N) in the MR system 100. Similarly, the time from an exposure center time $t_{Exp\_Center\_CAM1(N-1)}$ when the first imaging unit 501 acquires a first captured image (N−1) to a time $t_{Disp(N-1)}$ when a combined image (N−1) is displayed on the display unit 504 is a delay time (N−1). As a result, the delay time (N−1) is greater than the delay time (N). As described above, with the frame rates of the imaging units 501 and 502 and the frame rate of the display unit 504 being asynchronous with each other, the delay time varies for each frame.

Further, at a time $t_{Disp(N+1)}$, processing (N+1) by the processing units is not completed, and the already prepared combined image (N) is displayed again. A combined image (N+1) is actually displayed at a time $t_{Disp(N+2)}$ (not illustrated), and a delay time (N+1) at this time is greater than the delay times (N) and (N−1).

As described above, with the frame rate of the display unit 504 being faster than the frame rate of the first imaging unit 501, a combined image is not generated in time for the update timing of the display, resulting in the same combined image displayed. This gives a feeling of discomfort to the smoothness of a moving image felt by the user. Conversely, with the frame rate of the display unit 504 being slower than the frame rate of the first imaging unit 501, two combined images are generated between the update timings of the display, whereby one of the combined images is skipped without being displayed. This similarly gives a feeling of discomfort to the user.

FIG. 5 is a block diagram illustrating an example of the functional configurations of the HMD 101 and the image processing apparatus 104. First, the HMD 101 will be described. The HMD 101 includes the first imaging unit 501, the second imaging unit 502, the orientation sensor 503, the display unit 504, a detection unit 505, a control unit 506, a generation unit 507, a setting unit 508, and an interface (I/F) 509.

The first imaging unit 501 captures an image of the real space to be combined with an image of the virtual space and includes a left-eye imaging unit and a right-eye imaging unit. The left-eye imaging unit captures a moving image of the real space corresponding to the left eye of the wearer of the HMD 101 and outputs an image (a captured image) of each frame in the moving image. The right-eye imaging unit captures a moving image of the real space corresponding to the right eye of the wearer of the HMD 101 and outputs an image (a captured image) of each frame in the moving image. That is, the first imaging unit 501 acquires a captured image as a stereo image having a parallax approximately matching the positions of the left eye and the right eye of the wearer of the HMD 101. It is desirable that in the HMD 101 for the MR system 100, the center optical axis of the imaging range of the first imaging unit 501 be placed to approximately coincide with the line-of-sight direction of the wearer of the HMD 101.

The left-eye imaging unit and the right-eye imaging unit each include an optical system and an imaging device.

Light entering from the external world enters an imaging device through the optical system, and the imaging device outputs an image according to the incident light as a captured image. As the imaging devices of the first imaging unit 501, imaging sensors using the rolling shutter method are used. The first imaging unit 501 periodically outputs a captured image and also outputs a synchronization signal indicating the output start timing (the image output timing) of the captured image.

The second imaging unit 502 includes a plurality of imaging units for capturing images of the real space used for positioning and acquires a captured image as a stereo image having a parallax. Each of the imaging units captures a moving image of the real space and outputs an image (a captured image) of each frame in the moving image. Each of the imaging units included in the second imaging unit 502 includes an optical system and an imaging device. Light entering from the external world enters an imaging device through the optical system, and the imaging device outputs an image according to the incident light as a captured image. As the imaging devices of the imaging unit 502, imaging sensors using the global shutter method are used. Every time the plurality of imaging units included in the imaging unit 502 receives a synchronization signal from the generation unit 507, the plurality of imaging units starts exposure. When the exposure time for a single frame elapses, the plurality of imaging units ends the exposure.

The orientation sensor 503 functions as a detection unit. Every time the orientation sensor 503 receives a synchronization signal from the generation unit 507, the orientation sensor 503 detects (measures) the position and orientation of the HMD 101 and outputs the detected position and orientation. Examples of the orientation sensor 503 to be implemented include a magnetic sensor, an ultrasonic sensor, an acceleration sensor, or an angular velocity sensor.

The display unit 504 includes a right-eye display unit and a left-eye display unit. An image of the mixed reality space for the left eye received from the image processing apparatus 104 via the I/F 509 is displayed on the left-eye display unit, and an image of the mixed reality space for the right eye received from the image processing apparatus 104 via the I/F 509 is displayed on the right-eye display unit. The left-eye display unit and the right-eye display unit each include a display optical system and a display element. As the display optical system, an eccentric optical system, such as a freeform surface prism, as well as a normal coaxial optical system or an optical system provided with a zoom mechanism, may be used. Examples of the display element to be used include a small liquid crystal display, a small organic electroluminescent (EL) display, or a retina scan-type device based on microelectromechanical systems (MEMS). Light from an image displayed on the display element enters the eye of the wearer of the HMD 101 through the display optical system. Based on a synchronization signal of a combined image received from the image processing apparatus 104, the display unit 504 displays the combined image of the mixed reality space received from the image processing apparatus 104 on each frame. The synchronization signal of the combined image is a signal indicating the image input timing of the input of the image to the display unit 504.

The detection unit 505 detects a synchronization signal of a combined image of the mixed reality space (a signal indicating the start timing of the display of the image on the display unit 504) received from the image processing apparatus 104 via the I/F 509. When the detection unit 505 detects the synchronization signal, the detection unit 505 notifies the generation unit 507 of the detection.

According to changes in the processing times taken to perform various types of processing that are received from the image processing apparatus 104 via the I/F 509, the exposure times of the first imaging unit 501 and the second imaging unit 502 set by the setting unit 508, and a synchronization reference timing setting, the control unit 506 controls the generation of a synchronization signal by the generation unit 507. Specifically, first, the control unit 506 determines a synchronization reference line indicating which of the lines of the first imaging unit 501 that are being exposed at different timings is selected so as to make the exposure time of the selected line and the second imaging unit 502 and the orientation sensor 503 in synchronization with each other. Next, according to the setting of the exposure time of the first imaging unit 501, the setting of the exposure time of the second imaging unit 502, and a synchronization reference timing setting indicating which timing in the exposure time (the start of the exposure, the center of the exposure, or the end of the exposure) of the synchronization reference line is selected for the synchronization, the control unit 506 determines a synchronization reference timing as a reference for synchronizing the exposure timing of the first imaging unit 501, the exposure timing of the second imaging unit 502, and the acquisition timing of the orientation sensor 503 and sets the synchronization reference timing in the generation unit 507.

When the generation unit 507 receives a notification from the detection unit 505, then based on the synchronization signal detected by the detection unit 505 and the synchronization reference timing determined by the control unit 506, the generation unit 507 generates synchronization signals to be supplied to the first imaging unit 501, the second imaging unit 502, and the orientation sensor 503. Then, the generation unit 507 supplies the generated synchronization signals to the first imaging unit 501, the second imaging unit 502, and the orientation sensor 503. The setting unit 508 sets various parameters for use in the operation of the HMD 101.

A first captured image output from the first imaging unit 501, a second captured image output from the second imaging unit 502, and the position and orientation output from the orientation sensor 503 are each transmitted to the image processing apparatus 104 via the I/F 509.

The image processing apparatus 104 will be described. The image processing apparatus 104 includes an I/F 510, a processing unit 511, a generation unit 512, a content database (DB) 513, a combining unit 514, a processing unit 515, a comparison unit 516, and a setting unit 517. The image processing apparatus 104 receives captured images and a position and orientation transmitted from the HMD 101 via the I/F 510. The processing unit 511 performs various types of image processing on the captured images received from the HMD 101 via the I/F 510.

The generation unit 512 extracts (recognizes) the marker 202 from a left-eye captured image and a right-eye captured image subjected to image processing by the processing unit 511. Then, the generation unit 512 obtains the positions and orientations of the left-eye imaging unit and the right-eye imaging unit based on the marker 202 and the position and orientation received from the HMD 101 via the I/F 510 and outputs a synchronization signal of the captured images. The process for obtaining the positions and orientations of the imaging units based on the marker 202 in the images and the position and orientation measured by the orientation sensor 503 included in the HMD 101 together with the imaging units that have captured the images is known, and a description of this technique will be omitted.

The content DB 513 stores various pieces of data (virtual space data) required to draw an image of the virtual space. For example, the virtual space data includes data defining virtual objects included in the virtual space (e.g., data defining the geometric shape, the color, the texture, and the placement position and orientation of each virtual object). For example, the virtual space data also includes data defining a light source placed in the virtual space (e.g., data defining the type and the position and orientation of the light source).

The combining unit 514 constructs the virtual space using the virtual space data stored in the content DB 513. Then, the combining unit 514 generates an image L of the virtual space viewed from an eyepoint with the position and orientation of the left-eye imaging unit obtained by the generation unit 512. The combining unit 514 also generates an image R of the virtual space viewed from an eyepoint with the position and orientation of the right-eye imaging unit obtained by the generation unit 512. Then, the combining unit 514 generates a combined image L obtained by combining the image L of the virtual space and a captured image captured by the left-eye imaging unit as an image L of the mixed reality space for the left eye. The combining unit 514 also generates a combined image R obtained by combining the image R of the virtual space and a captured image captured by the right-eye imaging unit as an image R of the mixed reality space for the right eye. Then, the combining unit 514 outputs a synchronization signal of a combined image.

The processing unit 515 performs various types of image processing on the image L of the mixed reality space and the image R of the mixed reality space generated by the combining unit 514. Then, the processing unit 515 functions as a transmission unit and transmits the image L of the mixed reality space and the image R of the mixed reality space subjected to the image processing and a synchronization signal of a combined image of the combining unit 514 to the HMD 101 via the I/F 510.

The comparison unit 516 compares a synchronization signal of captured images output from the generation unit 512 and a synchronization signal of a combined image output from the combining unit 514 and detects a change in the processing time taken from when the imaging unit 501 acquires the captured images to when the generation unit 512 generates position/orientation information. Then, the comparison unit 516 transmits the detected change in the processing time to the HMD 101 via the I/F 510.

The setting unit 517 sets various parameters for use in the operation of the image processing apparatus 104.

Figure 6:
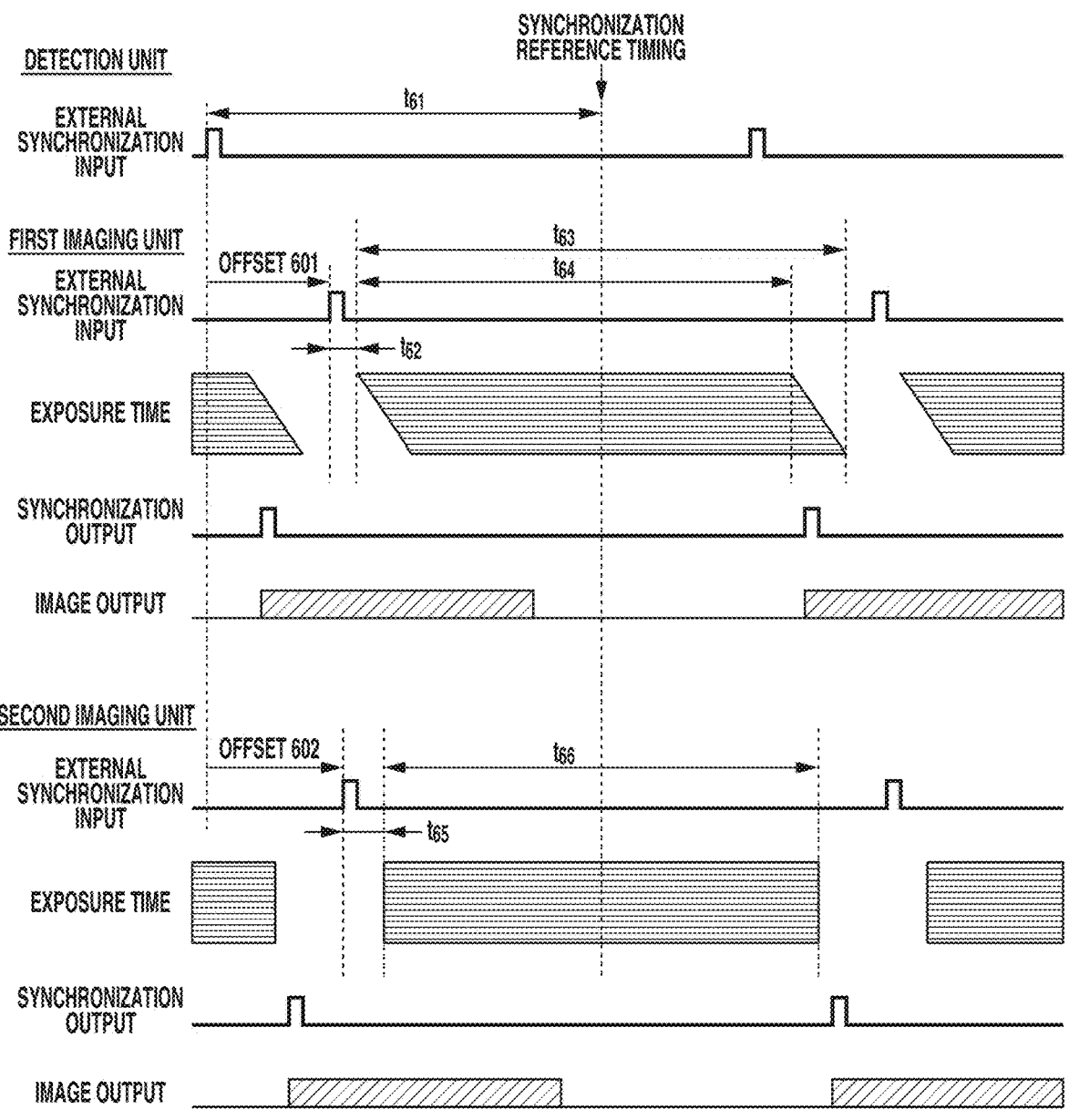
FIG. 6 is a diagram illustrating generation of external synchronization inputs.

FIG. 6 is a diagram illustrating an example of the generation of synchronization signals to be supplied to the first imaging unit 501 and the second imaging unit 502 by the generation unit 507. In FIG. 6, the horizontal axis represents time.

When the detection unit 505 detects a synchronization signal of a combined image of the mixed reality space received from the image processing apparatus 104 via the I/F 509, the detection unit 505 notifies the generation unit 507 of the detection. When the generation unit 507 receives the notification, then based on a synchronization reference timing set by the control unit 506, and an offset 601 after the detection timing of the synchronization signal, the generation unit 507 generates "a synchronization signal (an external synchronization input) for controlling the start of exposure of the first imaging unit 501". A case herein is described where the synchronization reference timing is the centers of the exposure periods of the first imaging unit 501 and the second imaging unit 502.

Suppose that the time from the detection timing of the synchronization signal to "the synchronization reference timing in the exposure time of the first imaging unit 501 in a frame following this detection timing" is $t_{61}$, "the processing time until the start of exposure" unique to the first imaging unit 501 is $t_{62}$, the exposure time of the first imaging unit 501 corresponding to a single frame is $t_{63}$, and the exposure time of the first imaging unit 501 corresponding to a single line is $t_{64}$. Suppose that the total number of imaging lines of the first imaging unit 501 is $L_{CAM1\_TOTAL}$, and a synchronization reference line is $L_{61}$, the offset 601 in this case can be obtained according to the following formula.

$$\text{Offset } 601 = t_{61} - t_{62} - t_{64}/2 - (t_{63} - t_{64}) \times L_{61}/L_{CAM1\_TOTAL}$$

Similarly, when the generation unit 507 receives the notification indicating the detection of the synchronization signal of the combined image of the mixed reality space by the detection unit 505, then based on the synchronization reference timing set by the control unit 506, and an offset 602 after the detection timing of the synchronization signal, the generation unit 507 generates "a synchronization signal (an external synchronization input) for controlling the start of exposure of the second imaging unit 502". Suppose that "the processing time until the start of exposure" unique to the second imaging unit 502 is $t_{65}$, and the exposure time of the second imaging unit 502 corresponding to a single frame is $t_{66}$, the offset 602 in this case can be obtained according to the following formula.

$$\text{Offset } 602 = t_{61} - t_{65} - t_{66}/2$$

The control unit 506 may regularly or irregularly obtain and set the offsets 601 and 602. Then, the generation unit 507 supplies the thus generated "synchronization signal for controlling the start of exposure of the first imaging unit 501" to the first imaging unit 501 and supplies the thus generated "synchronization signal for controlling the start of exposure of the second imaging unit 502" to the second imaging unit 502.

When the first imaging unit 501 receives the thus generated "synchronization signal for controlling the start of exposure of the first imaging unit 501", the first imaging unit 501 starts exposure. When the second imaging unit 502 receives the thus generated "synchronization signal for controlling the start of exposure of the second imaging unit 502", the second imaging unit 502 starts exposure. Since the center time of the exposure time of the first imaging unit 501 and the center time of the exposure time of the second imaging unit 502 coincide with the synchronization reference timing, as a result, the first imaging unit 501 and the second imaging unit 502 synchronously perform the exposure. In other words, the generation unit 507 generates synchronization signals to be supplied to the first imaging unit 501 and the second imaging unit 502 so that the center time of the exposure time of the first imaging unit 501 and the center time of the exposure time of the second imaging unit 502 coincide with each other.

In the above description, the case has been described where the synchronization reference timing in the synchronous operations is the centers of the exposure periods of the first imaging unit 501 and the second imaging unit 502. The present disclosure, however, is not so limited. The setting of the synchronization reference timing in the present exemplary embodiment is not limited to this, and can be any timing in the exposure times.

Figure 7:
FIG. 7 is a diagram illustrating generation of external synchronization inputs.

FIG. 7 is a diagram illustrating synchronous operations of the display unit 504, the imaging unit 501, the imaging unit 502, and the orientation sensor 503 according to the present exemplary embodiment. In FIG. 7, the horizontal axis represents time. The following is a description of a generation process for generating synchronization signals to be supplied to the second imaging unit 502 and the orientation sensor 503 in view of a shift in the exposure time by line of a captured image captured by each imaging sensor using the rolling shutter method in the first imaging unit 501.

If the detection unit 505 detects a synchronization signal (a synchronization input) of a combined image received from the image processing apparatus 104 via the I/F 509, the detection unit 505 notifies the generation unit 507 of the detection. When the generation unit 507 receives the notification, then according to a synchronization reference timing set by the control unit 506, the generation unit 507 generates synchronization signals to be supplied to the first imaging unit 501 and the second imaging unit 502 and a synchronization signal to be supplied to the orientation sensor 503.

It is premised that the exposure time of the first imaging unit 501 and the exposure time of the second imaging unit 502 are equal to each other, and the control unit 506 or the setting unit 508 makes a setting so that "the synchronization reference timing is the exposure start time of the first line of the captured image captured by the first imaging unit 501". In this case, an offset 701 after the detection timing of the synchronization signal, the generation unit 507 generates "a synchronization signal (an external synchronization input) for controlling the start of exposure of the first imaging unit 501". The offset 701 can be obtained as a result of subtracting the time $t_{62}$ from the time from the detection timing of the synchronization signal to "the exposure start time of the first line of the captured image captured by the first imaging unit 501".

When the first imaging unit 501 receives the thus generated "synchronization signal for controlling the start of exposure of the first imaging unit 501", the first imaging unit 501 starts exposure and outputs data on each line captured by the exposure according to the synchronization output of the first imaging unit 501 itself. an offset 704 after the detection timing of the synchronization signal, the generation unit 507 also generates "a synchronization signal (an external synchronization input) for controlling the start of exposure of the second imaging unit 502". The offset 704 can be obtained as a result of subtracting the time $t_{65}$ from the time from the detection timing of the synchronization signal to "the exposure start time of the first line of the captured image captured by the second imaging unit 502".

When the second imaging unit 502 receives the thus generated "synchronization signal for controlling the start of exposure of the second imaging unit 502", the second imaging unit 502 starts exposure and outputs data on each line captured by the exposure according to the synchronization output of the second imaging unit 502 itself. An offset 707 after the detection timing of the synchronization signal, the generation unit 507 also generates "a synchronization signal (an external synchronization input) for controlling the start of measurement (the acquisition timing) of the position and orientation by the orientation sensor 503". The offset 707 can be obtained as a result of subtracting the processing time $t_{Sens\_Ready}$ from the time from the detection timing of the synchronization signal to "the exposure start time of the first line of the captured image captured by the first imaging unit 501". When the orientation sensor 503 receives the thus generated "synchronization signal for controlling the start of measurement of the position and orientation by the orientation sensor 503", the orientation sensor 503 starts measuring the position and orientation (data acquisition) and outputs the acquired position and orientation.

It is premised that the exposure time of the first imaging unit 501 and the exposure time of the second imaging unit 502 are equal to each other, and the control unit 506 or the setting unit 508 makes a setting so that "the synchronization reference timing is the exposure center time of the central line of the captured image captured by the first imaging unit 501". In this case, an offset 702 after the detection timing of the synchronization signal, the generation unit 507 generates "a synchronization signal (an external synchronization input) for controlling the start of exposure of the first imaging unit 501". The offset 702 can be obtained as a result of subtracting a time $t_{72}$ from the time from the detection timing of the synchronization signal to "the exposure start time of the central line of the captured image captured by the first imaging unit 501". An offset 705 after the detection timing of the synchronization signal, the generation unit 507 also generates "a synchronization signal (an external synchronization input) for controlling the start of exposure of the second imaging unit 502". The offset 705 can be obtained as a result of subtracting the time $t_{65}$ from the time from the detection timing of the synchronization signal to "the exposure start time of the central line of the captured image captured by the first imaging unit 501".

An offset 708 after the detection timing of the synchronization signal, the generation unit 507 also generates "a synchronization signal (an external synchronization input) for controlling the start of measurement of the position and orientation by the orientation sensor 503". The offset 708 can be obtained as a result of subtracting the processing time $t_{Sens\_Ready}$ from the time from the detection timing of the synchronization signal to "the exposure center time of the central line of the captured image captured by the first imaging unit 501".

It is premised that the exposure time of the first imaging unit 501 and the exposure time of the second imaging unit 502 are equal to each other, and the control unit 506 or the setting unit 508 makes a setting so that "the synchronization reference timing is the exposure end time of the last line of the captured image captured by the first imaging unit 501". In this case, an offset 703 after the detection timing of the synchronization signal, the generation unit 507 generates "a synchronization signal (an external synchronization input) for controlling the start of exposure of the first imaging unit 501". The offset 703 can be obtained as a result of subtracting the time $t_{62}$ from the time from the detection timing of the synchronization signal to "the exposure start time of the last line of the captured image captured by the first imaging unit 501". An offset 706 after the detection timing of the synchronization signal, the generation unit 507 also generates "a synchronization signal (an external synchronization input) for controlling the start of exposure of the second imaging unit 502". The offset 706 can be obtained as a result of subtracting the time $t_{65}$ from the time from the detection timing of the synchronization signal to "the exposure start time of the last line of the captured image captured by the first imaging unit 501".

An offset 709 after the detection timing of the synchronization signal, the generation unit 507 also generates "a synchronization signal (an external synchronization input) for controlling the start of measurement of the position and orientation by the orientation sensor 503". The offset 709 can be obtained as a result of subtracting the processing time $t_{Sens\_Ready}$ from the time from the detection timing of the synchronization signal to "the exposure end time of the last line of the captured image captured by the first imaging unit 501".

As described above, the control unit 506 sets the generation unit 507 so that synchronization signals to be supplied to the first imaging unit 501, the second imaging unit 502, and the orientation sensor 503 by the generation unit 507 are generated based on a synchronization reference timing set by the setting unit 508.

Additionally, at any timing, such as the exposure start time of the last line or the exposure end time of the first line, and based on the contents of various settings made by the control unit 506 or the setting unit 508, offsets for the first imaging unit 501, the second imaging unit 502, and the orientation sensor 503 can be adjusted. This allows synchronous operations.

Figure 8:
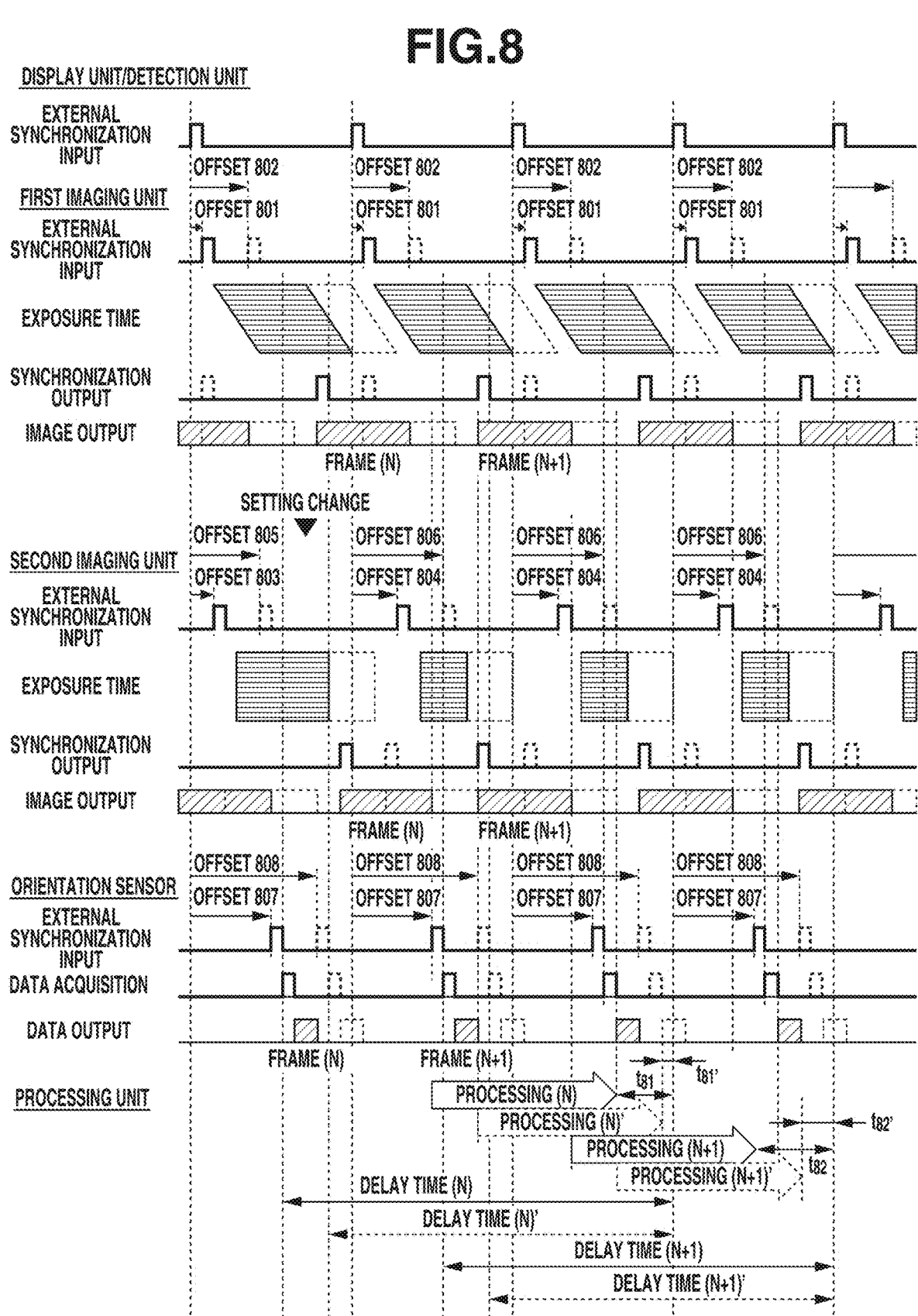
FIG. 8 is a diagram illustrating synchronous operations of imaging units and an orientation sensor.

FIG. 8 is a diagram illustrating a generation process for generating synchronization signals to be supplied to the first imaging unit 501, the second imaging unit 502, and the orientation sensor 503 in view of the processing times taken to perform captured image processing, position/orientation information generation, and image combining so as to achieve a smaller delay time from the capturing of an image to the display of the image.

The detection unit 505 detects a synchronization signal of a combined image corresponding to captured images of an N-th frame (a frame (N)) from the image processing apparatus 104 via the I/F 509. Subsequently, after an offset 801, the generation unit 507 generates "a synchronization signal (an external synchronization input) for controlling the start of exposure of the first imaging unit 501 (for capturing the frame (N))" and supplies the generated synchronization signal to the first imaging unit 501.

When the detection unit 505 detects the synchronization signal of the combined image corresponding to the captured images (the frame (N)), then after an offset 803, the generation unit 507 generates "a synchronization signal (an external synchronization input) for controlling the start of exposure of the second imaging unit 502 (for capturing the frame (N))" and supplies the generated synchronization signal to the second imaging unit 502. The offsets 801 and 803 can be obtained by the calculation method described with reference to FIG. 7 (the offset calculation method in a case where "the synchronization reference timing is the exposure center time of the central line of the captured image captured by the first imaging unit 501"). When the detection unit 505 detects the synchronization signal of the combined image corresponding to the captured images (the frame (N)), then after an offset 807, the generation unit 507 generates "a synchronization signal (an external synchronization input) for controlling the start of measurement of the position and orientation by the orientation sensor 503 (for the frame (N))" and supplies the generated synchronization signal to the orientation sensor 503. The offset 807 can be obtained by the calculation method described with reference to FIG. 7 (the offset calculation method in a case where "the synchronization reference timing is the exposure center time of the central line of the captured image captured by the first imaging unit 501").

It is premised that during the time from when the detection unit 505 detects the synchronization signal of the combined image corresponding to the captured images (the frame (N)) to when the detection unit 505 detects a synchronization signal of a combined image corresponding to a frame (N+1), the setting unit 508 makes a setting for changing the exposure time of the second imaging unit 502 (a setting change).

At this time, the detection unit 505 detects a synchronization signal of a combined image corresponding to captured images of an (N+1)-th frame (a frame (N+1)) from the image processing apparatus 104 via the I/F 509. Subsequently, after an offset 804, the generation unit 507 generates "a synchronization signal (an external synchronization input) for controlling the start of exposure of the second imaging unit 502 (for capturing the frame (N+1))" and supplies the generated synchronization signal to the second imaging unit 502. The offset 804 can be obtained by a method similar to that for the offset 803.

If a setting change is not made by the setting unit 508, the offsets do not switch. The control unit 506 sets a synchronization reference timing in the generation unit 507 so that synchronization signals to be supplied to the first imaging unit 501, the second imaging unit 502, and the orientation sensor 503 are generated based on offsets according to changes in the settings of the exposure times of the imaging units by the setting unit 508.

At this time, a delay time from when the first imaging unit 501 acquires the captured image corresponding to the frame (N) and the various processing units perform processing (N) to when the display unit 504 displays the combined image using the frame (N) is represented as a delay time (N). Similarly, a delay time from when the first imaging unit 501 acquires the captured image corresponding to the frame (N+1) and the various processing units perform processing (N+1) to when the display unit 504 displays the combined image using the frame (N+1) is represented as a delay time (N+1). A time $t_{81}$ from when the processing (N) is completed to when the display unit 504 displays the combined image and a time $t_{82}$ from when the processing (N+1) is completed to when the display unit 504 displays the combined image are in the states where the combined images wait to be displayed even though the combined images are prepared, which leads to an excessive delay time. Thus, setting offset times so that the times $t_{81}$ and $t_{82}$ are smaller allows reduction of delay times in the MR system 100.

Specifically, if the detection unit 505 detects a synchronization signal of a combined image corresponding to captured images of an N-th frame (a frame (N)) from the image processing apparatus 104 via the I/F 509, then after an offset 802, the generation unit 507 generates "a synchronization signal (an external synchronization input) for controlling the start of exposure of the first imaging unit 501 (for capturing the frame (N))" and supplies the generated synchronization signal to the first imaging unit 501. If the detection unit 505 detects the synchronization signal of the combined image corresponding to the captured images of the N-th frame (the frame (N)), then after an offset 805, the generation unit 507 generates "a synchronization signal (an external synchronization input) for controlling the start of exposure of the second imaging unit 502 (for capturing the frame (N))" and supplies the generated synchronization signal to the second imaging unit 502. If the detection unit 505 detects the synchronization signal of the combined image corresponding to the captured images of the N-th frame (the frame (N)), then after an offset 808, the generation unit 507 generates "a synchronization signal (an external synchronization input) for controlling the start of measurement of the position and orientation by the orientation sensor 503 (for the frame (N))" and supplies the generated synchronization signal to the orientation sensor 503.

It is premised that during the time from when the detection unit 505 detects the synchronization signal corresponding to the frame (N) to when the detection unit 505 detects a synchronization signal corresponding to a frame (N+1), the setting unit 508 makes a setting for changing the exposure time of the second imaging unit 502 (a setting change).

At this time, the detection unit 505 detects a synchronization signal of a combined image corresponding to captured images of an (N+1)-th frame (a frame (N+1)) from the image processing apparatus 104 via the I/F 509. Subsequently, after an offset 806, the generation unit 507 generates "a synchronization signal (an external synchronization input) for controlling the start of exposure of the second imaging unit 502 (for capturing the frame (N+1))" and supplies the generated synchronization signal to the second imaging unit 502.

If a setting change is not made by the setting unit 508, the offsets do not switch. The control unit 506 sets a synchronization reference timing in the generation unit 507 so that synchronization signals to be supplied to the first imaging unit 501, the second imaging unit 502, and the orientation sensor 503 are generated based on offsets according to changes in the settings of the exposure times of the imaging units by the setting unit 508.

At this time, a delay time from when the first imaging unit 501 acquires the captured image corresponding to the frame (N) and the various processing units perform processing (N)' to when the display unit 504 displays the combined image using the frame (N) is represented as a delay time (N)'. Similarly, a delay time from when the first imaging unit 501 acquires the captured image corresponding to the frame (N+1) and the various processing units perform processing (N+1)' to when the display unit 504 displays the combined image using the frame (N+1) is represented as a delay time (N+1)'. A time $t_{81}$' from when the processing (N)' is completed to when the display unit 504 displays the combined image and a time $t_{82}$' from when the processing (N+1) is completed to when the display unit 504 displays the combined image are smaller than the times $t_{81}$ and $t_{82}$, respectively. Thus, the delay times in the MR system 100 are reduced.

Comparing the times $t_{81}$ and $t_{82}$ with each other, and the times $t_{81}$' and $t_{82}$' with each other, the times from when the processing (N) and the processing (N+1) are completed to when the combined images are displayed are changed by the setting unit 508 making the setting for changing the exposure time of the second imaging unit 502 (the setting change). Thus, in adjusting offsets to reduce delay, it is necessary to adjust the offset amounts according to the settings of the exposure times of the first imaging unit 501 and the second imaging unit 502, the setting of the synchronization reference timing by the setting unit 508, and the combination of the various processing times. The offsets can be adjusted by the comparison unit 516 of the image processing apparatus 104 comparing the synchronization signal of the captured images and the synchronization signal of the combined image after the various types of processing, detecting variation in the processing times based on a change in the difference in time between the synchronization signals, and feeding back the variation in the processing times to the control unit 506 of the HMD 101.

The above process allows synchronous operations of the first imaging unit 501, the second imaging unit 502, and the orientation sensor 503 with the display unit 504 and reduction of a delay time from the capturing of an image to the display of the image in the MR system 100.

Figure 9:
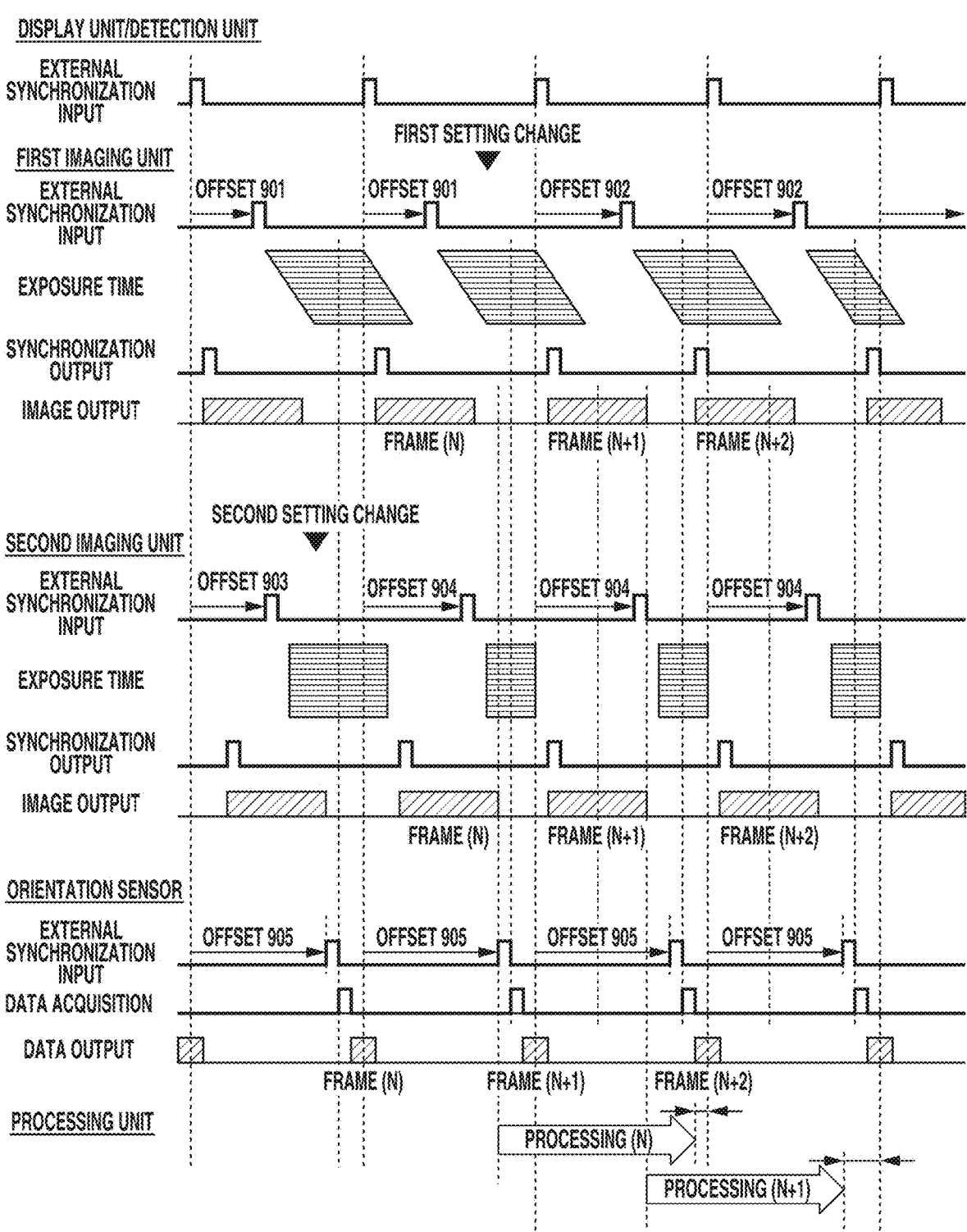
FIG. 9 is a diagram illustrating a generation process for generating synchronization signals.

FIG. 9 illustrates a generation process for generating synchronization signals to be supplied to the first imaging unit 501, the second imaging unit 502, and the orientation sensor 503 by setting the exposure center time of the central line of a captured image captured by each imaging sensor using the rolling shutter method as a synchronization reference timing.

The detection unit 505 detects a synchronization signal of a combined image corresponding to captured images of an N-th frame (a frame (N)) from the image processing apparatus 104 via the I/F 509. Subsequently, after an offset 901, the generation unit 507 generates "a synchronization signal (an external synchronization input) for controlling the start of exposure of the first imaging unit 501 (for capturing the frame (N))" and supplies the generated synchronization signal to the first imaging unit 501. If the detection unit 505 detects the synchronization signal of the combined image corresponding to the captured images of the N-th frame (the frame (N)), then after an offset 903, the generation unit 507 generates "a synchronization signal (an external synchronization input) for controlling the start of exposure of the second imaging unit 502 (for capturing the frame (N))" and supplies the generated synchronization signal to the second imaging unit 502. The offsets 901 and 903 can be obtained by the calculation method described with reference to FIG. 7 (the offset calculation method in a case where "the synchronization reference timing is the exposure center time of the central line of the captured image captured by the first imaging unit 501") and the method for making a delay time smaller that is described with reference to FIG. 8. If the detection unit 505 detects the synchronization signal of the combined image corresponding to the captured images of the N-th frame (the frame (N)), then after an offset 905, the generation unit 507 generates "a synchronization signal (an external synchronization input) for controlling the start of measurement of the position and orientation by the orientation sensor 503 (for the frame N)" and supplies the generated synchronization signal to the orientation sensor 503. The offset 905 can be obtained by the calculation method described with reference to FIG. 7 (the offset calculation method in a case where "the synchronization reference timing is the exposure center time of the central line of the captured image captured by the first imaging unit 501") and the method for making a delay time smaller that is described with reference to FIG. 8.

It is premised that during the time from when the detection unit 505 detects the synchronization signal of the combined image corresponding to the frame (N) to when the detection unit 505 detects a synchronization signal of a combined image corresponding to a frame (N+1), the setting unit 508 makes a setting for changing the exposure time of the second imaging unit 502 (a second setting change).

At this time, the detection unit 505 detects a synchronization signal of a combined image corresponding to captured images of an (N+1)-th frame (a frame (N+1)) from the image processing apparatus 104 via the I/F 509. Subsequently, after the offset 901, the generation unit 507 generates "a synchronization signal (an external synchronization input) for controlling the start of exposure of the first imaging unit 501 (for capturing the frame (N+1))" and supplies the generated synchronization signal to the first imaging unit 501. If the detection unit 505 detects the synchronization signal of the combined image corresponding to the captured images of the (N+1)-th frame (the frame (N+1)), then after an offset 904, the generation unit 507 generates "a synchronization signal (an external synchronization input) for controlling the start of exposure of the second imaging unit 502 (for capturing the frame (N+1))" and supplies the generated synchronization signal to the second imaging unit 502. The offset 904 can be obtained by a method similar to that for the offset 903. If the detection unit 505 detects the synchronization signal of the combined image corresponding to the captured images of the (N+1)-th frame (the frame (N+1)), then after the offset 905, the generation unit 507 generates "a synchronization signal (an external synchronization input) for controlling the start of measurement of the position and orientation by the orientation sensor 503 (for the frame (N+1))" and supplies the generated synchronization signal to the orientation sensor 503.

It is premised that during the time from when the detection unit 505 detects the synchronization signal of the combined image corresponding to the frame (N+1) to when the detection unit 505 detects a synchronization signal corresponding to a frame (N+2), the setting unit 508 makes a setting for changing the exposure time of the first imaging unit 501 (a first setting change).

At this time, the detection unit 505 detects a synchronization signal of a combined image corresponding to captured images of an (N+2)-th frame (a frame (N+2)) from the image processing apparatus 104 via the I/F 509. Subsequently, after an offset 902, the generation unit 507 generates "a synchronization signal (an external synchronization input) for controlling the start of exposure of the first imaging unit 501 (for capturing the frame (N+2))" and supplies the generated synchronization signal to the first imaging unit 501. The offset 902 can be obtained by a method similar to that for the offset 901. If the detection unit 505 detects the synchronization signal of the combined image corresponding to the captured images of the (N+2)-th frame (the frame (N+2)), then after the offset 904, the generation unit 507 generates "a synchronization signal (an external synchronization input) for controlling the start of exposure of the second imaging unit 502 (for capturing the frame (N+2))" and supplies the generated synchronization signal to the second imaging unit 502. If the detection unit

505 detects the synchronization signal of the combined image corresponding to the captured images of the (N+2)-th frame (the frame (N+2)), then after the offset 905, the generation unit 507 generates "a synchronization signal (an external synchronization input) for controlling the start of measurement of the position and orientation by the orientation sensor 503 (for the frame (N+2))" and supplies the generated synchronization signal to the orientation sensor 503.

From this point onward, a setting change is not made by the setting unit 508, and thus, the offsets do not switch. The control unit 506 sets a synchronization reference timing in the generation unit 507 so that synchronization signals to be supplied to the first imaging unit 501, the second imaging unit 502, and the orientation sensor 503 are generated based on offsets according to changes in the settings of the exposure times of the imaging units by the setting unit 508.

The above process allows, even when a setting change is made, the center time of the exposure time of the central line of the first imaging unit 501, the center time of the exposure time of the second imaging unit 502, and the data acquisition timing of the position and orientation acquired by the orientation sensor 503 to coincide with each other. Further, the process achieves synchronous operations with the display unit 504 with a smaller delay time from the capturing of an image to the display of the image.

Figure 10:
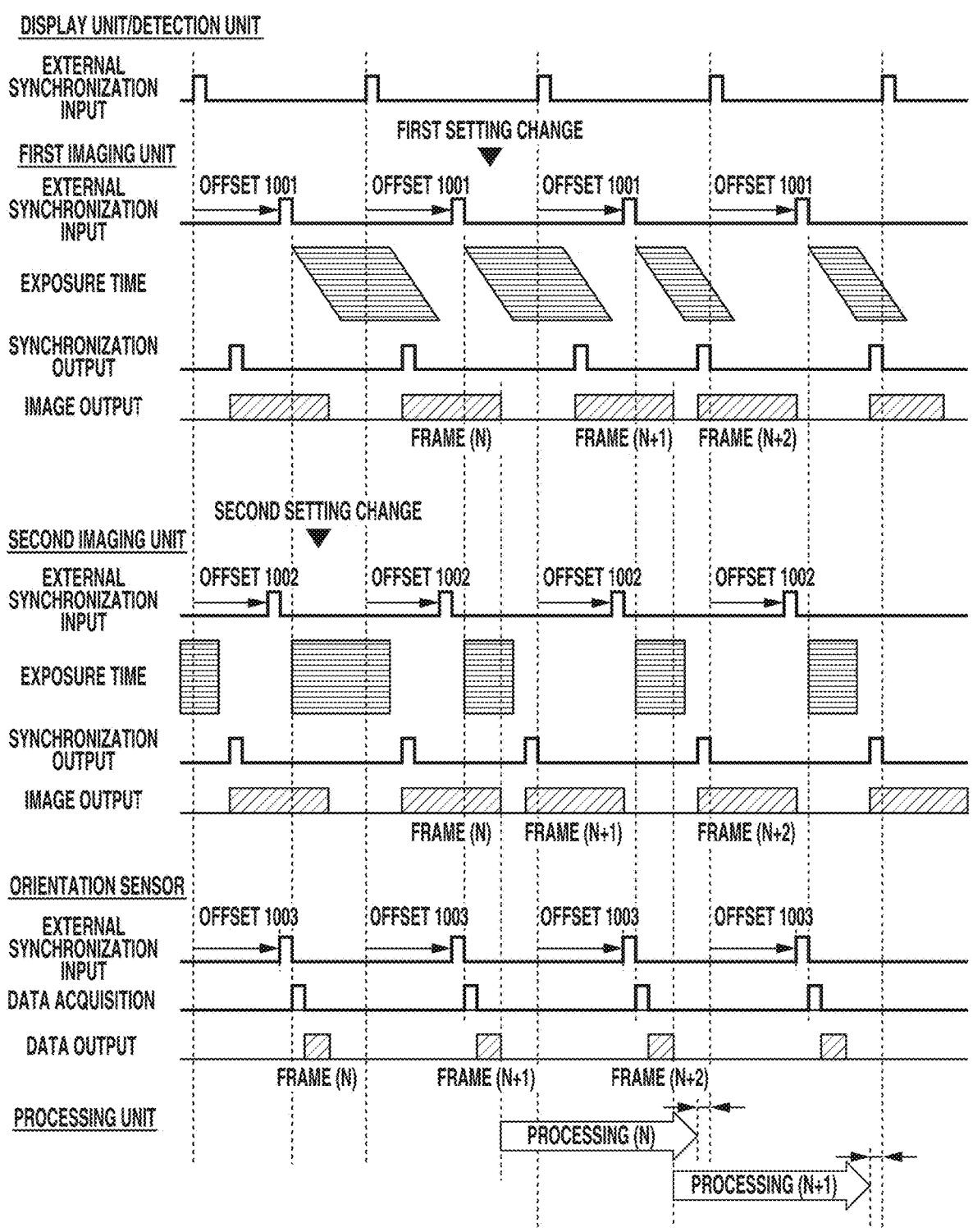
FIG. 10 is a diagram illustrating a generation process for generating synchronization signals.

FIG. 10 illustrates a generation process for generating synchronization signals to be supplied to the second imaging unit 502 and the orientation sensor 503 by setting the exposure start time of the first line of a captured image captured by each imaging sensor using the rolling shutter method as a synchronization reference timing.

The detection unit 505 detects a synchronization signal of a combined image corresponding to captured images of an N-th frame (a frame (N)) from the image processing apparatus 104 via the I/F 509. Subsequently, after an offset 1001, the generation unit 507 generates "a synchronization signal (an external synchronization input) for controlling the start of exposure of the first imaging unit 501 (for capturing the frame N)" and supplies the generated synchronization signal to the first imaging unit 501. If the detection unit 505 detects the synchronization signal of the combined image corresponding to the captured images of the N-th frame (the frame (N)), then after an offset 1002, the generation unit 507 generates "a synchronization signal (an external synchronization input) for controlling the start of exposure of the second imaging unit 502 (for capturing the frame (N))" and supplies the generated synchronization signal to the second imaging unit 502. The offsets 1001 and 1002 can be obtained by the calculation method described with reference to FIG. 7 (the offset calculation method in a case where "the synchronization reference timing is the exposure start time of the first line of the captured image captured by the first imaging unit 501") and the method for making a delay time smaller that is described with reference to FIG. 8. If the detection unit 505 detects the synchronization signal of the combined image corresponding to the captured images of the N-th frame (the frame (N)), then after an offset 1003, the generation unit 507 generates "a synchronization signal (an external synchronization input) for controlling the start of measurement of the position and orientation by the orientation sensor 503 (for the frame N)" and supplies the generated synchronization signal to the orientation sensor 503. The offset 1003 can be obtained by the calculation method described with reference to FIG. 7 (the offset calculation method in a case where "the synchronization reference timing is the exposure start time of the first line of the captured image captured by the first imaging unit 501") and the method for making a delay time smaller that is described with reference to FIG. 8.

It is premised that during the time from when the detection unit 505 detects the synchronization signal of the combined image corresponding to the frame (N) to when the detection unit 505 detects a synchronization signal of a combined image corresponding to a frame (N+1), the setting unit 508 makes a setting for changing the exposure time of the second imaging unit 502 (a second setting change).

At this time, the detection unit 505 detects a synchronization signal of a combined image corresponding to captured images of an (N+1)-th frame (a frame (N+1)) from the image processing apparatus 104 via the I/F 509. Subsequently, after the offset 1001, the generation unit 507 generates "a synchronization signal (an external synchronization input) for controlling the start of exposure of the first imaging unit 501 (for capturing the frame (N+1))" and supplies the generated synchronization signal to the first imaging unit 501. Even if the second setting change is made, the relationship between the exposure start time of the first imaging unit 501 and the processing time from the external synchronization input to the second imaging unit 502 to the exposure start time of the second imaging unit 502 does not change, and thus, the offset does not need to be changed. Thus, if the detection unit 505 detects the synchronization signal of the combined image corresponding to the captured images of the (N+1)-th frame (the frame (N+1)), then after the offset 1002, the generation unit 507 generates "a synchronization signal (an external synchronization input) for controlling the start of exposure of the second imaging unit 502 (for capturing the frame (N+1))" and supplies the generated synchronization signal to the second imaging unit 502. Even if the second setting change is made, the relationship between the exposure start time of the first imaging unit 501 and the processing time from the external synchronization input to the orientation sensor 503 to the start of measurement of the position and orientation by the orientation sensor 503 does not change, and thus, the offset does not need to be changed. Thus, if the detection unit 505 detects the synchronization signal of the combined image corresponding to the captured images of the (N+1)-th frame (the frame (N+1)), then after the offset 1003, the generation unit 507 generates "a synchronization signal (an external synchronization input) for controlling the start of measurement of the position and orientation by the orientation sensor 503 (for the frame (N+1))" and supplies the generated synchronization signal to the orientation sensor 503.

It is premised that during the time from when the detection unit 505 detects the synchronization signal of the combined image corresponding to the frame (N) to when the detection unit 505 detects a synchronization signal of a combined image corresponding to a frame (N+2), the setting unit 508 makes a setting for changing the exposure time of the first imaging unit 501 (a first setting change).

At this time, even if the first setting change is made, the exposure start time of the first imaging unit 501 does not change, and thus, the offset does not need to change. Thus, if the detection unit 505 detects a synchronization signal of a combined image corresponding to captured images of an (N+2)-th frame (a frame (N+2)) from the image processing apparatus 104 via the I/F 509, then after the offset 1001, the generation unit 507 generates "a synchronization signal (an external synchronization input) for controlling the start of exposure of the first imaging unit 501 (for capturing the frame (N+2))" and supplies the generated synchronization signal to the first imaging unit 501. Even if the first setting change is made, the relationship between the exposure start time of the first imaging unit 501 and the processing time from the external synchronization input to the second imaging unit 502 to the exposure start time of the second imaging unit 502 does not change, and thus, the offset does not need to be changed. Thus, if the detection unit 505 detects the synchronization signal of the combined image corresponding to the captured images of the (N+2)-th frame (the frame (N+2)), then after the offset 1002, the generation unit 507 generates "a synchronization signal (an external synchronization input) for controlling the start of exposure of the second imaging unit 502 (for capturing the frame (N+2))" and supplies the generated synchronization signal to the second imaging unit 502. Even if the first setting change is made, the relationship between the exposure start time of the first imaging unit 501 and the processing time from the external synchronization input to the orientation sensor 503 to the start of measurement of the position and orientation by the orientation sensor 503 does not change, and thus, the offset does not need to be changed. Thus, if the detection unit 505 detects the synchronization signal of the combined image corresponding to the captured images of the (N+2)-th frame (the frame (N+2)), then after the offset 1003, the generation unit 507 generates "a synchronization signal (an external synchronization input) for controlling the start of measurement of the position and orientation by the orientation sensor 503 (for the frame (N+2))" and supplies the generated synchronization signal to the orientation sensor 503.

From this point onward, a setting change is not made by the setting unit 508. As described above, the control unit 506 sets a synchronization reference timing in the generation unit 507 so that synchronization signals to be supplied to the first imaging unit 501, the second imaging unit 502, and the orientation sensor 503 are generated based on offsets according to changes in the settings of the exposure times of the imaging units by the setting unit 508.

The above process allows, even when a setting change is made, the exposure start time of the first line of the captured image captured by the first imaging unit 501, the exposure start time of the first line of the captured image captured by the second imaging unit 502, and the data acquisition timing of the orientation sensor 503 to coincide with each other. Further, the process achieves synchronous operations with the display unit 504 with a smaller delay time from the capturing of an image to the display of the image.

It should be noted that if the synchronization reference timing is set to the exposure start time, and even if setting changes are made in the first imaging unit 501 and the second imaging unit 502, offsets for generating external synchronization inputs to the first imaging unit 501, the second imaging unit 502, and the orientation sensor 503 do not need to be changed. This applies to a case where the synchronization reference timing is set to the exposure start time of any line, as well as a case where the synchronization reference timing is set to the exposure start time of the first line. By using this, it is also possible to simplify an offset change process when a setting change is made, and reduce the processing load and the circuit size of the HMD 101.

Figure 11:
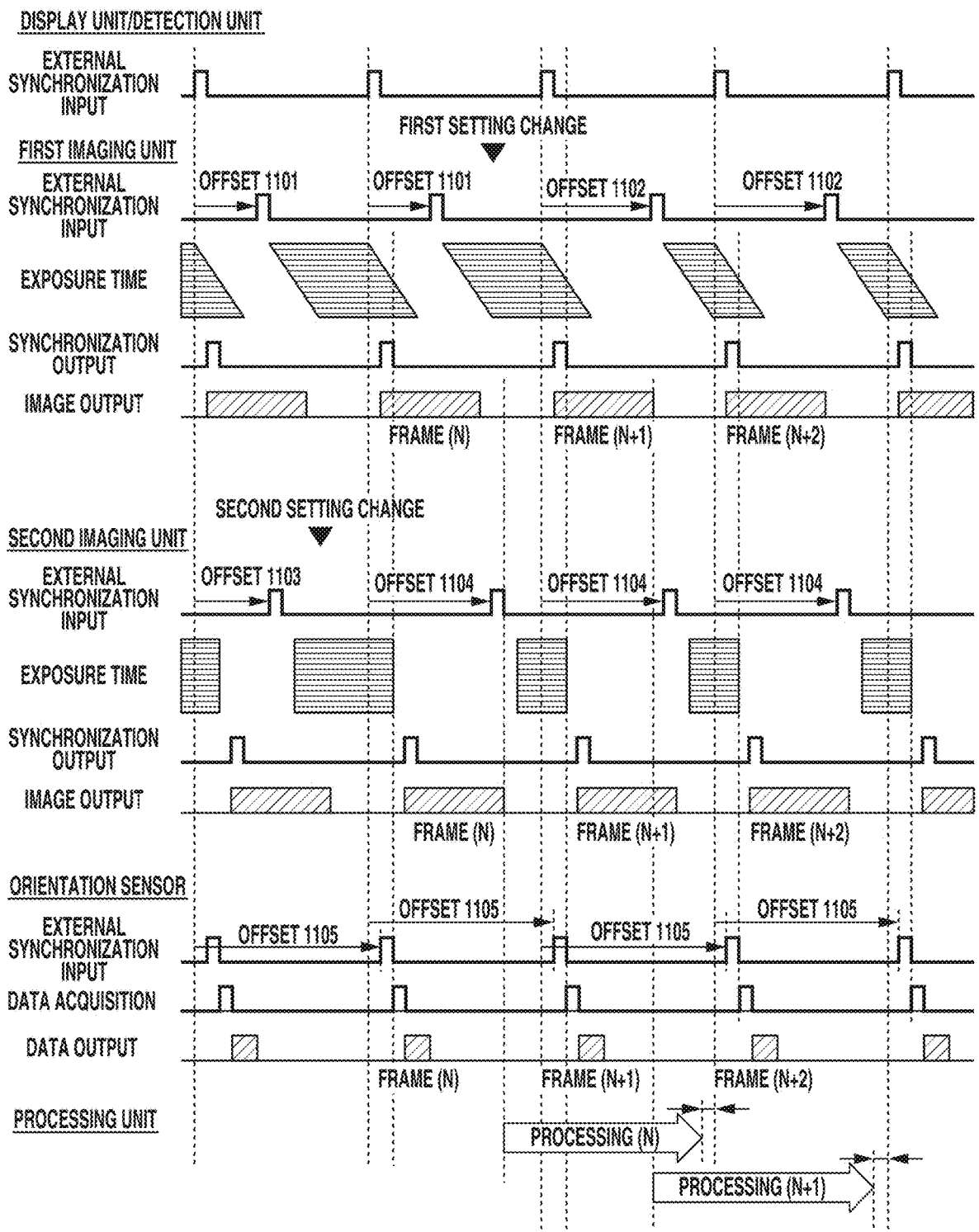
FIG. 11 is a diagram illustrating a generation process for generating synchronization signals.

FIG. 11 illustrates a generation process for generating synchronization signals to be supplied to the first imaging unit 501, the second imaging unit 502, and the orientation sensor 503 by setting the exposure end time of the central line of a captured image captured by each imaging sensor using the rolling shutter method as a synchronization reference timing.

The detection unit 505 detects a synchronization signal of a combined image corresponding to captured images of an N-th frame (a frame (N)) from the image processing apparatus 104 via the I/F 509. Subsequently, after an offset 1101, the generation unit 507 generates "a synchronization signal (an external synchronization input) for controlling the start of exposure of the first imaging unit 501 (for capturing the frame (N))" and supplies the generated synchronization signal to the first imaging unit 501.

If the detection unit 505 detects the synchronization signal of the combined image corresponding to the captured images of the N-th frame (the frame (N)), then after an offset 1103, the generation unit 507 generates "a synchronization signal (an external synchronization input) for controlling the start of exposure of the second imaging unit 502 (for capturing the frame (N))" and supplies the generated synchronization signal to the second imaging unit 502. The offsets 1101 and 1103 can be obtained as a result of subtracting "the difference between the exposure end time of the last line and the exposure end time of the central line" from an offset obtained by the offset calculation method where "the synchronization reference timing is the exposure end time of the last line of the captured image captured by the first imaging unit 501" described with reference to FIG. 7, and by the method for making a delay time smaller that is described with reference to FIG. 8. If the detection unit 505 detects the synchronization signal of the combined image corresponding to captured images of the N-th frame (the frame (N)), then after an offset 1105, the generation unit 507 generates "a synchronization signal (an external synchronization input) for controlling the start of measurement of the position and orientation by the orientation sensor 503 (for the frame N)" and supplies the generated synchronization signal to the orientation sensor 503. The offset 1105 can be obtained as a result of subtracting "the difference between the exposure end time of the last line and the exposure end time of the central line" from an offset obtained by the offset calculation method where "the synchronization reference timing is the exposure end time of the last line of the captured image captured by the first imaging unit 501" described with reference to FIG. 7, and by the method for making a delay time smaller that is described with reference to FIG. 8.

It herein is premised that during the time from when the detection unit 505 detects the synchronization signal of the combined image corresponding to the frame (N) to when the detection unit 505 detects a synchronization signal of a combined image corresponding to a frame (N+1), the setting unit 508 makes a setting for changing the exposure time of the second imaging unit 502 (a second setting change).

At this time, the detection unit 505 detects a synchronization signal of a combined image corresponding to captured images of an (N+1)-th frame (a frame (N+1)) from the image processing apparatus 104 via the I/F 509. Subsequently, after the offset 1101, the generation unit 507 generates "a synchronization signal (an external synchronization input) for controlling the start of exposure of the first imaging unit 501 (for capturing the frame (N+1))" and supplies the generated synchronization signal to the first imaging unit 501. If the detection unit 505 detects the synchronization signal of the combined image corresponding to captured images of the (N+1)-th frame (the frame (N+1)), then after an offset 1104, the generation unit 507 generates "a synchronization signal (an external synchronization input) for controlling the start of exposure of the second imaging unit 502 (for capturing the frame (N+1))" and supplies the generated synchronization signal to the second imaging unit 502. The offset 1104 can be obtained similarly to the offset 1103. If the detection unit 505 detects the synchronization signal of the combined image corresponding to the captured images of the (N+1)-th frame (the frame (N+1)), then after the offset 1105, the generation unit 507 generates "a synchronization signal (an external synchronization input) for controlling the start of measurement of the position and orientation by the orientation sensor 503 (for the frame (N+1))" and supplies the generated synchronization signal to the orientation sensor 503.

It is premised that during the time from when the detection unit 505 detects the synchronization signal of the combined image corresponding to the frame (N+1) to when the detection unit 505 detects a synchronization signal of a combined image corresponding to a frame (N+2), the setting unit 508 makes a setting for changing the exposure time of the first imaging unit 501 (a first setting change).

At this time, the detection unit 505 detects a synchronization signal of a combined image corresponding to captured images of an (N+2)-th frame (a frame (N+2)) from the image processing apparatus 104 via the I/F 509. Subsequently, after an offset 1102, the generation unit 507 generates "a synchronization signal (an external synchronization input) for controlling the start of exposure of the first imaging unit 501 (for capturing the frame (N+2))" and supplies the generated synchronization signal to the first imaging unit 501. The offset 1102 can be obtained similarly to the offset 1101. Even if the first setting change is made, the relationship between the exposure end time of the first imaging unit 501 and the processing time from the external synchronization input to the second imaging unit 502 to the exposure end time of the second imaging unit 502 does not change, and thus, the offset does not need to be changed. Thus, if the detection unit 505 detects the synchronization signal of the combined image corresponding to the captured images of the (N+2)-th frame (the frame (N+2)), then after the offset 1104, the generation unit 507 generates "a synchronization signal (an external synchronization input) for controlling the start of exposure of the second imaging unit 502 (for capturing the frame (N+2))" and supplies the generated synchronization signal to the second imaging unit 502. Even if the first setting change is made, the relationship between the exposure end time of the first imaging unit 501 and the processing time from the external synchronization input to the orientation sensor 503 to the start of measurement of the position and orientation by the orientation sensor 503 does not change, and thus, the offset does not need to be changed. Thus, if the detection unit 505 detects the synchronization signal of the combined image corresponding to the captured images of the (N+2)-th frame (the frame (N+2)), then after the offset 1105, the generation unit 507 generates "a synchronization signal (an external synchronization input) for controlling the start of measurement of the position and orientation by the orientation sensor 503 (for the frame (N+2))" and supplies the generated synchronization signal to the orientation sensor 503.

From this point onward, a setting change is not made by the setting unit 508, and thus, offsets do not switch. The control unit 506 sets a synchronization reference timing in the generation unit 507 so that synchronization signals to be supplied to the first imaging unit 501, the second imaging unit 502, and the orientation sensor 503 are generated based on offsets according to changes in the settings of the exposure times of the imaging units by the setting unit 508.

The above process allows, even when a setting change is made, the exposure end time of the central line of a captured image captured by the first imaging unit 501, the exposure end time of the central line of the captured image captured by the second imaging unit 502, and the data acquisition timing of the orientation sensor 503 to coincide with each other. Further, the process achieves synchronous operations with the display unit 504 with a smaller delay time from the capturing of an image to the display of the image.

It should be noted that if the synchronization reference timing is set to the exposure end time, and even if setting changes are made in the first imaging unit 501 and the second imaging unit 502, the cycles of the synchronization outputs and the image outputs of the first imaging unit 501 and the second imaging unit 502 and the data output of the orientation sensor 503 are constant. For example, in FIGS. 9 and 10, when the first setting change in the first imaging unit 501 and the second setting change in the second imaging unit 502 are made, the cycles of the synchronization outputs and the image outputs of the first imaging unit 501 and the second imaging unit 502 vary. If captured images are not output in constant cycles, it is necessary to select an integrated circuit (IC) that supports such output cycles as a captured image processing unit at the subsequent stage. It is also possible to expand the range of options for the captured image processing unit at the subsequent stage by separately adding a frame memory and controlling a read operation from the frame memory to adjust the cycles of captured images output from the first imaging unit 501 and the second imaging unit 502 to be constant. That increases the processing load and the circuit size. Even in FIG. 11, this variation in the cycles of the data output similarly occurs if the synchronization reference line is changed. In this case, for example, by limiting a setting change of the synchronization reference line while the HMD 101 and the image processing apparatus 104 are operating as the MR system 100, it is also possible to prevent an increase in the processing load or the circuit size for addressing the variation in the cycles.

Figure 12:
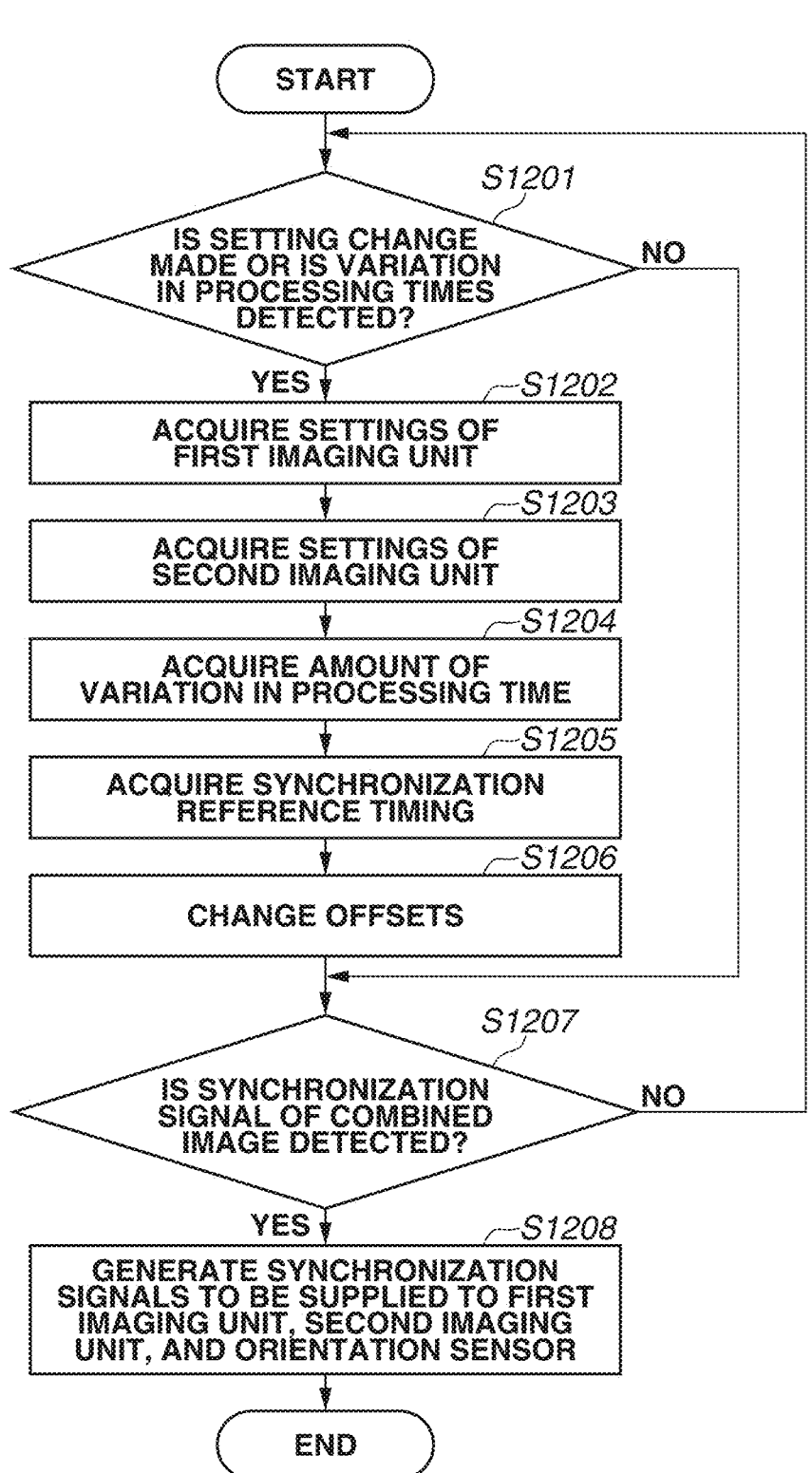
FIG. 12 is a flowchart of control of synchronous operations.

FIG. 12 is a flowchart illustrating control of synchronous operations of the first imaging unit 501, the second imaging unit 502, and the orientation sensor 503 by the HMD 101 according to the present exemplary embodiment. A control method for the HMD 101 will be described.

In step S1201, the control unit 506 determines whether the setting unit 508 makes a setting change in the synchronization reference timing, the first imaging unit 501, or the second imaging unit 502 or a setting change for changing a synchronization timing in an exposure time, or the comparison unit 516 detects variation in the processing times taken to perform various types of image processing. If, as a result of this determination, a setting change is made or variation in the processing times is detected as described above (YES in step S1201), the processing proceeds to step S1202. If, on the other hand, a setting change is not made or variation in the processing times is not detected as described above (NO in step S1201), the processing proceeds to step S1207.

In step S1202, the control unit 506 acquires the settings of the first imaging unit 501 (at least including parameters regarding the first imaging unit 501 required to obtain an offset) from the setting unit 508.

In step S1203, the control unit 506 acquires the settings of the second imaging unit 502 (at least including parameters regarding the second imaging unit 502 required to obtain an offset) from the setting unit 508.

In step S1204, the control unit 506 acquires the amount of variation in the processing time of each frame detected by the comparison unit 516. The comparison unit 516 compares a synchronization signal of captured images output from the generation unit 512 and a synchronization signal of a combined image output from the combining unit 514 on each frame and detects the processing time of each frame.

In step S1205, the control unit 506 acquires from the setting unit 508 a setting regarding which line of a captured image captured by the first imaging unit 501 is selected and which time in the exposure period of the selected line is set as a synchronization reference timing.

In step S1206, based on the information acquired in steps S1202 to S1205, the control unit 506 performs the above process, thereby obtaining offsets corresponding to the first imaging unit 501, the second imaging unit 502, and the orientation sensor 503.

In step S1207, the generation unit 507 determines whether the detection unit 505 detects a synchronization signal (a synchronization input) of a combined image received from the image processing apparatus 104 via the I/F 509. If, as a result of this determination, the detection unit 505 detects the synchronization signal (the synchronization input) (YES in step S1207), the processing proceeds to step S1208. If, on the other hand, the detection unit 505 does not detect the synchronization signal (the synchronization input) (NO in step S1207), the processing returns to step S1201.

In step S1208, the generation unit 507 receives from the detection unit 505 a notification that the synchronization signal (the synchronization input) of the combined image is received. Subsequently, after an offset corresponding to the first imaging unit 501 from the detection timing of the synchronization signal, the generation unit 507 generates "a synchronization signal to be supplied to the first imaging unit 501", and after an offset corresponding to the second imaging unit 502, the generation unit 507 generates "a synchronization signal to be supplied to the second imaging unit 502". Then, the generation unit 507 supplies the generated synchronization signals to the first imaging unit 501 and the second imaging unit 502, respectively. Further, an offset corresponding to the orientation sensor 503 after the detection timing of the synchronization signal, the generation unit 507 generates "a synchronization signal to be supplied to the orientation sensor 503" and supplies the generated synchronization signal to the orientation sensor 503.

As described above, if the exposure time of the first imaging unit 501 or the exposure time of the second imaging unit 502 is changed, the generation unit 507 changes the generation timings of a synchronization signal of the first imaging unit 501 and a synchronization signal of the second imaging unit 502 so that a first time in the exposure time of the first imaging unit 501 and a second time in the exposure time of the second imaging unit 502 coincide with each other.

In the case of FIG. 9, the first time in the exposure time of the first imaging unit 501 is the center time of the exposure time of a particular line of the first imaging unit 501. The second time in the exposure time of the second imaging unit 502 is the center time of the exposure time of the second imaging unit 502.

In the case of FIG. 10, the first time in the exposure time of the first imaging unit 501 is the exposure start time of a particular line of the first imaging unit 501. The second time in the exposure time of the second imaging unit 502 is the exposure start time of the second imaging unit 502.

In the case of FIG. 11, the first time in the exposure time of the first imaging unit 501 is the exposure end time of a particular line of the first imaging unit 501. The second time in the exposure time of the second imaging unit 502 is the exposure end time of the second imaging unit 502.

If the processing times of the images captured by the first imaging unit 501 and the second imaging unit 502 vary between frames in step S1204, the generation unit 507 changes the generation timing of a synchronization signal of the first imaging unit 501 or a synchronization signal of the second imaging unit 502.

As described above, in the present exemplary embodiment, it is possible to cause the display unit 504, the first imaging unit 501, the second imaging unit 502, and the orientation sensor 503 to perform synchronous operations based on a synchronization signal of a combined image to be supplied to the display unit 504, and further make a delay time from the capturing of an image to the display of the image smaller. Further, it is also possible to accommodate a setting change in the exposure time of the first imaging unit 501 or the second imaging unit 502 and a setting change in the synchronization reference timing. The image capturing and data acquisition timings of the devices are caused to coincide with any timing in the exposure times, whereby it is possible to achieve a more realistic MR experience in which there is no positional shift between a captured image and an image of a virtual space.

A second exemplary embodiment will be described. In the following exemplary embodiments including the second exemplary embodiment, the differences from the first exemplary embodiment will be described, and the following exemplary embodiments without the differences are similar to the first exemplary embodiment unless otherwise stated. In the first exemplary embodiment, a description has been given of the configuration in which, using the settings of the first imaging unit 501 and the second imaging unit 502 made by the setting unit 508, information regarding the setting of the synchronization reference timing, and information regarding variation in the image processing times detected by the comparison unit 516, and based on the detection timing of a synchronization signal of a combined image detected by the detection unit 505, synchronization signals for the devices are generated. In the second exemplary embodiment, a configuration will be described in which more accurate synchronous operations of the devices are achieved by further using a region of interest in an image to the wearer of the HMD 101.

Figure 13:
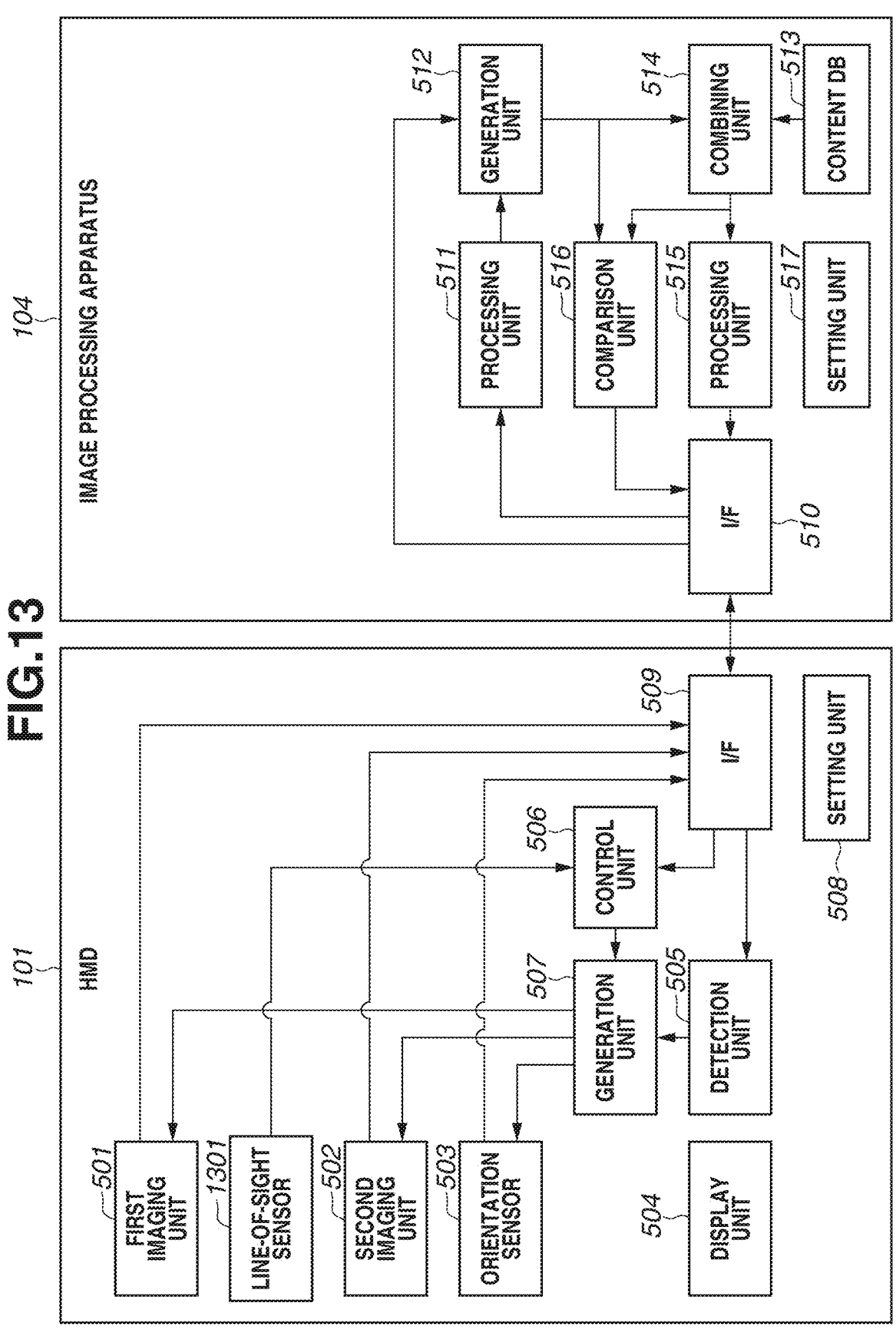
FIG. 13 is a diagram illustrating an example of functional configurations.

FIG. 13 is a block diagram illustrating an example of the functional configurations of the HMD 101 and the image processing apparatus 104 according to the second exemplary embodiment. In FIG. 13, a line-of-sight sensor 1301 is added to FIG. 5. The HMD 101 further includes the line-of-sight sensor 1301.

To identify the region of interest to the wearer of the HMD 101 in the imaging range of the first imaging unit 501 or in the display range of the display unit 504, the line-of-sight sensor 1301 detects the line of sight of the wearer of the HMD 101 using a known technique, such as a corneal reflection method through the use of an infrared camera. The line-of-sight sensor 1301 functions as an identifying unit and identifies the region of interest in the imaging range of the first imaging unit 501 by line-of-sight detection. Specifically, the line-of-sight sensor 1301 functions as a detection unit, detects the line-of-sight position of the wearer of the HMD 101 in the imaging range of the first imaging unit 501, and identifies the line-of-sight position as the region of interest.

According to a synchronization reference timing determined based on line-of-sight information detected by the line-of-sight sensor 1301, changes in the processing times taken to perform various types of processing that are received from the image processing apparatus 104 via the I/F 509, and the exposure times of the first imaging unit 501 and the second imaging unit 502 set by the setting unit 508, the control unit 506 controls the generation of a synchronization signal by the generation unit 507. Specifically, first, based on the region of interest to the wearer of the HMD 101 identified by the line-of-sight sensor 1301, the control unit 506 determines a synchronization reference line indicating which line is selected to synchronize the second imaging unit 502 and the orientation sensor 503 with the exposure time of the selected line, out of the lines of the first imaging unit 501 that are being exposed at different timings. Next, according to changes in the processing times taken to perform various types of processing that are received from the image processing apparatus 104 via the I/F 509, the setting of the exposure time of the first imaging unit 501, the setting of the exposure time of the second imaging unit 502, and a synchronization timing setting indicating which timing in the exposure time (the start of the exposure, the center of the exposure, or the end of the exposure) of the synchronization reference line is selected for the synchronization, the control unit 506 determines a synchronization reference timing as a reference for synchronizing the exposure timings of the first imaging unit 501 and the second imaging unit 502 and the acquisition timing of the orientation sensor 503 and sets the synchronization reference timing in the generation unit 507.

If the generation unit 507 receives a notification from the detection unit 505, then based on a synchronization signal of a combined image detected by the detection unit 505 and a synchronization reference timing determined by the control unit 506, the generation unit 507 generates synchronization signals to be supplied to the first imaging unit 501, the second imaging unit 502, and the orientation sensor 503.

Then, the generation unit 507 supplies the generated synchronization signals to the first imaging unit 501, the second imaging unit 502, and the orientation sensor 503.

Figure 14:
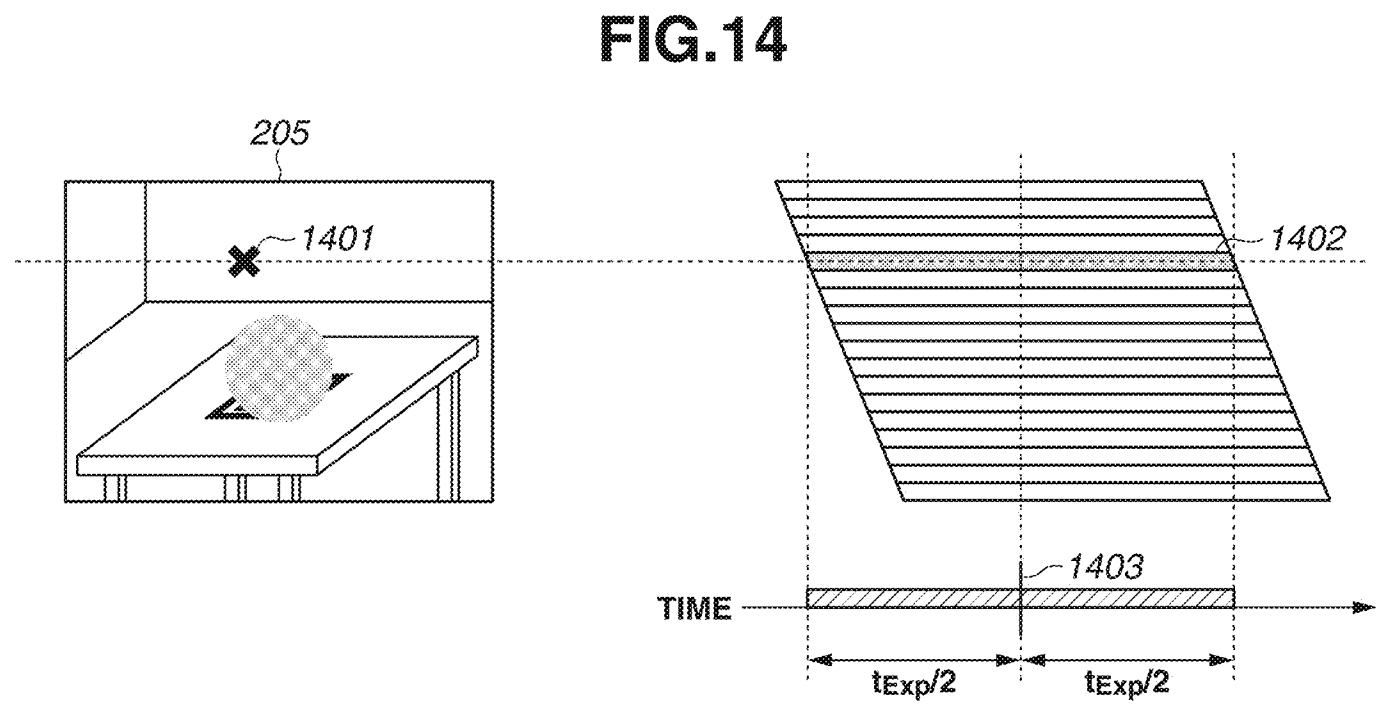

FIG. 14 is a diagram illustrating an example of the setting of a synchronization reference timing by the control unit 506. In the image 205 of the mixed reality that is being observed by the wearer of the HMD 101, a point of gaze 1401 as the region of interest gazed at by the wearer of the HMD 101 is obtained based on line-of-sight information detected by the line-of-sight sensor 1301. The control unit 506 determines a synchronization reference line 1402 on which the point of gaze 1401 is exposed in the entirety of the exposure time of the first imaging unit 501, and also determines a synchronization reference timing 1403 based on the synchronization timing setting (e.g., the center of the exposure) in the exposure time of the synchronization reference line 1402. Then, the control unit 506 sets the synchronization reference timing 1403 in the generation unit 507. The synchronization timing setting may be set in advance in the control unit 506, or any synchronization timing setting may be configured to be set from outside via the setting unit 508 to be allowed to be changed. The point of gaze 1401 is the region of interest in the imaging range of the first imaging unit 501. The synchronization reference line 1402 is set based on the point of gaze 1401.

Figure 15:
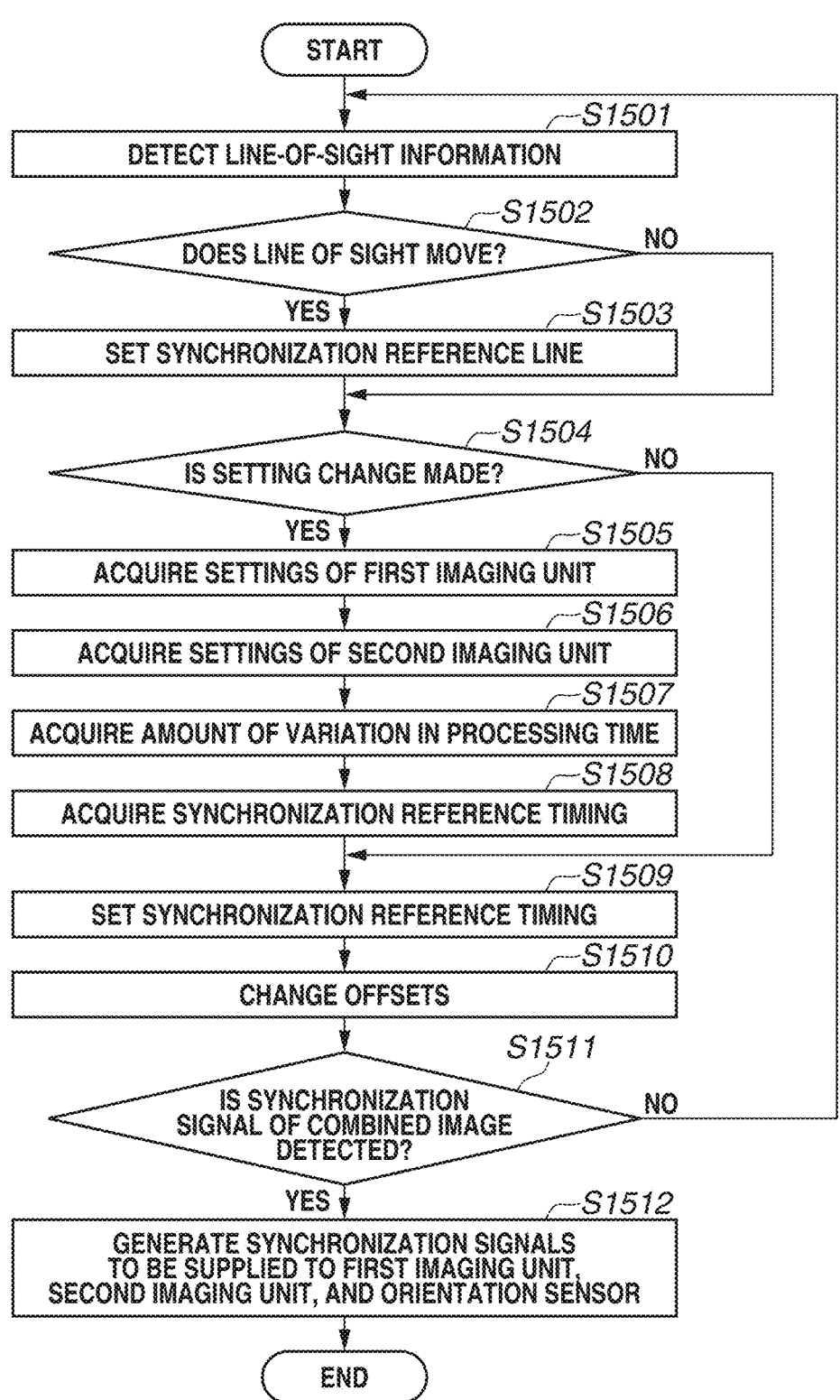
FIG. 15 is a flowchart of control of synchronous operations.

FIG. 15 is a flowchart illustrating control of synchronous operations of the display unit 504, the first imaging unit 501, the second imaging unit 502, and the orientation sensor 503 by the HMD 101 according to the second exemplary embodiment. A control method for the HMD 101 will be described.

In step S1501, the line-of-sight sensor 1301 detects line-of-sight information regarding the wearer of the HMD 101.

In step S1502, based on the line-of-sight information detected by the line-of-sight sensor 1301, the control unit 506 determines whether the line of sight of the wearer of the HMD 101 moves after a captured image of the first imaging unit 501 is previously acquired.

If, as a result of this determination, the line of sight of the wearer of the HMD 101 moves (YES in step S1502), the processing proceeds to step S1503. If, on the other hand, the line of sight of the wearer of the HMD 101 does not move (NO in step S1502), the processing proceeds to step S1504.

In step S1503, based on the line-of-sight information detected by the line-of-sight sensor 1301, the control unit 506 sets the synchronization reference line 1402 of the first imaging unit 501 in the generation unit 507.

In step S1504, the control unit 506 determines whether the setting unit 508 makes a setting change in the first imaging unit 501 or the second imaging unit 502 or a setting change for changing a synchronization timing in an exposure time, or whether the comparison unit 516 detects variation in the processing times taken to perform various types of image processing.

If, as a result of this determination, a setting change is made by the setting unit 508 as described above (YES in step S1504), the processing proceeds to step S1505. If, on the other hand, a setting change is not made by the setting unit 508 as described above (NO in step S1504), the processing proceeds to step S1509.

In step S1505, the control unit 506 acquires the settings of the first imaging unit 501 (at least including parameters regarding the first imaging unit 501 to obtain an offset) from the setting unit 508.

In step S1506, the control unit 506 acquires the settings of the second imaging unit 502 (at least including parameters regarding the second imaging unit 502 to obtain an offset) from the setting unit 508.

In step S1507, the control unit 506 acquires the amount of variation in the processing time of each frame detected by the comparison unit 516.

In step S1508, the control unit 506 acquires the synchronization timing setting (e.g., the center of the exposure) in the exposure time of the synchronization reference line 1402 from the setting unit 508.

In step S1509, based on the information acquired in steps S1503 to S1508, the control unit 506 determines the synchronization reference timing 1403 in the exposure time of the synchronization reference line 1402 of the first imaging unit 501 and sets the synchronization reference timing 1403 in the generation unit 507.

In step S1510, the generation unit 507 performs the above process, thereby obtaining offsets corresponding to the first imaging unit 501, the second imaging unit 502, and the orientation sensor 503.

In step S1511, the generation unit 507 determines whether the detection unit 505 detects a synchronization signal (a synchronization input) of a combined image received from the image processing apparatus 104 via the I/F 509. If, as a result of this determination, the detection unit 505 detects the synchronization signal (the synchronization input) (YES in step S1511), the processing proceeds to step S1512. If, on the other hand, the detection unit 505 does not detect the synchronization signal (the synchronization input) (NO in step S1511), the processing returns to step S1501.

In step S1512, if the generation unit 507 receives from the detection unit 505 a notification that the synchronization signal (the synchronization input) of the combined image is received, then an offset corresponding to the first imaging unit 501 after the detection timing of the synchronization signal, the generation unit 507 generates "a synchronization signal to be supplied to the first imaging unit 501", and after an offset corresponding to the second imaging unit 502, the generation unit 507 generates "a synchronization signal to be supplied to the second imaging unit 502". Then, the generation unit 507 supplies the generated synchronization signals to the first imaging unit 501 and the second imaging unit 502. Further, an offset corresponding to the orientation sensor 503 after the detection timing of the synchronization signal, the generation unit 507 generates "a synchronization signal to be supplied to the orientation sensor 503" and supplies the generated synchronization signal to the orientation sensor 503.

The above-described configuration according to the present exemplary embodiment also can cause the display unit 504, the imaging unit 501, the imaging unit 502, and the orientation sensor 503 to perform synchronous operations based on a synchronization signal of a combined image to be supplied to the display unit 504, and further make a delay time from the capturing of an image to the display of the image smaller. With line-of-sight information regarding the wearer of the HMD 101 and the processing times with respect to each device taken into account, the imaging exposure timings and the data acquisition timing of the devices can be caused to coincide with each other. Further, a setting change in the exposure time of the first imaging unit 501 or the second imaging unit 502 and a setting change in the synchronization timing can be accommodated. The imaging exposure periods of the devices and the synchronization reference timing 1403 for data acquisition are determined in the region of interest to the wearer of the HMD 101, providing a more realistic MR experience with no positional shift between a captured image and an image of a virtual space. Further, with the line-of-sight sensor 1301 provided with an external synchronization input function, a similar control method allows the detection timing of line-of-sight information detected by the line-of-sight sensor 1301 to be synchronized with the operations of the first imaging unit 501, the second imaging unit 502, and the orientation sensor 503 based on a synchronization signal of a combined image to be supplied to the display unit 504.

In this case, based on the synchronization signal of the combined image, the generation unit 507 generates a synchronization signal for controlling the acquisition timing of the line-of-sight position detected by the line-of-sight sensor 1301 so that a first time in the exposure time of the first imaging unit 501, a second time in the exposure time of the second imaging unit 502, the acquisition timing of the position and orientation detected by the orientation sensor 503, and the acquisition timing of the line-of-sight position detected by the line-of-sight sensor 1301 coincide with each other.

In the present exemplary embodiment, the region of interest to the wearer of the HMD 101 is the point of gaze detected by the line-of-sight sensor 1301. The method for setting the region of interest, however, is not limited to this. For example, generally, the wearer of the HMD 101 observing the MR space is often observing a display image with a focus on the virtual object 204, and thus, drawing position information regarding the virtual object 204 included in the image 203 of the virtual space can also be used as the region of interest. This creates an advantage that it is not necessary to add the line-of-sight sensor 1301. In this case, the control unit 506 functions as an identifying unit and identifies the region of interest based on the drawing position of the virtual object 204 included in the image 203 of the virtual space.

A third exemplary embodiment will be described. In the second exemplary embodiment, to determine the synchronization reference line 1402, the control unit 506 uses the point of gaze 1401 of the wearer of the HMD 101 detected by the line-of-sight sensor 1301. The synchronization reference line 1402, however, may be determined using extraction information regarding the marker 202 extracted (recognized) from a left-eye captured image and a right-eye captured image instead of the point of gaze 1401 of the wearer of the HMD 101 so that the generation unit 512 obtains position/orientation information. That is, the control unit 506 may identify the region of interest based on extraction information regarding the marker (feature) 202 extracted from images captured by the second imaging unit 502 and determine the synchronization reference line 1402. As the extraction information regarding the marker 202 extracted (recognized) from the left-eye captured image and the right-eye captured image so that the generation unit 512 obtains position/orientation information, the center-of-gravity position of a group of extracted markers may be used. Alternatively, any region, such as the center-of-gravity position of a marker having the greatest influence on the result of calculating the position and orientation may be used. Based on the synchronization reference line 1402 in which an extraction information region of the marker 202 is exposed in the entirety of the exposure time of the first imaging unit 501, and the synchronization timing setting in the exposure time of the synchronization reference line 1402, the control unit 506 determines the synchronization reference timing 1403 and sets the synchronization reference timing 1403 in the generation unit 507.

The above described configuration according to the present exemplary embodiment makes it possible to cause the display unit 504, the first imaging unit 501, the second imaging unit 502, and the orientation sensor 503 to perform synchronous operations based on a synchronization signal of a combined image to be supplied to the display unit 504, and further make a delay time from the capturing of an image to the display of the image smaller. With line-of-sight information regarding the wearer of the HMD 101 and the processing times with respect to each device taken into account, the imaging exposure timings and the data acquisition timing of the devices can be caused to coincide with each other. With extraction information regarding the marker 202 extracted (recognized) from a left-eye captured image and a right-eye captured image so that the generation unit 512 obtains position/orientation information and the processing times of each device taken into account, the image capturing and data acquisition timings of the devices can be caused to coincide with any timing in the exposure times. Further, a setting change in the exposure time of the first imaging unit 501 or the second imaging unit 502 and a setting change in the synchronization reference timing 1403 can be accommodated. The image capturing and data acquisition timings of the devices are caused to coincide with any timing in the exposure times, providing a more realistic MR experience with no positional shift between a captured image and an image of a virtual space. Similarly to a case where the drawing position information regarding the virtual object 204 included in the image 203 of the virtual space is used, there is also an advantage that it is not necessary to add the line-of-sight sensor 1301.

A fourth exemplary embodiment will be described. The function units of the HMD 101 and the image processing apparatus 104 illustrated in FIGS. 5 and 13 may be implemented by hardware, or some of the function units may be implemented by software (computer programs).

In the latter case, in the HMD 101, the first imaging unit 501, the second imaging unit 502, the orientation sensor 503, the display unit 504, the I/F 509, and the line-of-sight sensor 1301 may be implemented by hardware, and the remaining function units may be implemented by software. In this case, the software is stored in a memory included in the HMD 101, and a processor included in the HMD 101 runs the software, which carries out the functions of the corresponding function units.

FIG. 16A is a block diagram illustrating an example of the hardware configuration of the HMD 101 according to the fourth exemplary embodiment. The HMD 101 includes a processor 1610, a random-access memory (RAM) 1620, a non-volatile memory 1630, an imaging unit 1640, a line-of-sight sensor 1650, an orientation sensor 1660, a display unit 1670, an I/F 1680, and a bus 1690.

The processor 1610 performs various types of processing using computer programs and data stored in the RAM 1620. Through the processing, the processor 1610 controls the operation of the entirety of the HMD 101 and also performs or controls the processes as operations performed by the HMD 101 in the above description.

The RAM 1620 includes an area for storing computer programs and data loaded from the non-volatile memory 1630, and an area for storing data received from the image processing apparatus 104 via the I/F 1680. Further, the RAM 1620 includes a work area used by the processor 1610 to perform the various types of processing. As described above, the RAM 1620 can appropriately provide various areas.

The non-volatile memory 1630 stores computer programs and data for causing the processor 1610 to perform or control the above operation of the HMD 101. The computer programs stored in the non-volatile memory 1630 include computer programs for causing the processor 1610 to carry out the functions of the function units of the HMD 101 illustrated in FIG. 5 or 13 (except for the first imaging unit 501, the second imaging unit 502, the orientation sensor 503, the display unit 504, the I/F 509, and the line-of-sight sensor 1301). The computer programs and the data stored in the non-volatile memory 1630 are appropriately loaded into the RAM 1620 according to control of the processor 1610 and processed by the processor 1610.

The imaging unit 1640 includes the first imaging unit 501 and the second imaging unit 502. The line-of-sight sensor 1650 includes the line-of-sight sensor 1301. The orientation sensor 1660 includes the orientation sensor 503. The display unit 1670 includes the display unit 504. The I/F 1680 includes the I/F 509. The processor 1610, the RAM 1620, the non-volatile memory 1630, the imaging unit 1640, the line-of-sight sensor 1650, the orientation sensor 1660, the display unit 1670, and the I/F 1680 are each connected to the bus 1690. The configuration illustrated in FIG. 16A is an example of a configuration applicable to the HMD 101, and can be appropriately changed and modified.

Regarding the image processing apparatus 104, any computer apparatus capable of running software corresponding to the function units except for the I/F 510 and the content DB 513 is applicable to the image processing apparatus 104. With reference to a block diagram in FIG. 16B, an example of the hardware configuration of a computer apparatus applicable to the image processing apparatus 104 will now be described. The image processing apparatus 104 includes a central processing unit (CPU) 1601, a RAM 1602, a read-only memory (ROM) 1603, an operation unit 1604, a display unit 1605, an external storage device 1606, an I/F 1607, and a bus 1608.

The CPU 1601 performs various types of processing using computer programs and data stored in the RAM 1602 or the ROM 1603. Through the processing, the CPU 1601 controls the operation of the entirety of the image processing apparatus 104 and also performs or controls the processes as operations performed by the image processing apparatus 104 in the above description.

The RAM 1602 includes an area for storing computer programs and data loaded from the ROM 1603 or the external storage device 1606, and an area for storing data received from the HMD 101 via the I/F 1607. The RAM 1602 also includes a work area used by the CPU 1601 to perform the various types of processing. As described above, the RAM 1602 can appropriately provide various areas. The ROM 1603 stores setting data and a startup program of the image processing apparatus 104.

The operation unit 1604 is a user interface, such as a keyboard, a mouse, and a touch panel. The user can input various instructions to the CPU 1601 by operating the operation unit 1604.

The display unit 1605 includes a liquid crystal screen or a touch panel screen, and can display processing results of the CPU 1601 using images and characters. Alternatively, the display unit 1605 may be a projection apparatus, such as a projector that projects images and characters.

The external storage device 1606 is a large-capacity information storage device, such as a hard disk drive device. The external storage device 1606 stores an operating system (OS).

The external storage device 1606 stores computer programs and data for causing the CPU 1601 to carry out the functions of the function units of the image processing apparatus 104 illustrated in FIG. 5 or 13 (except for the I/F 510 and content DB 513). The external storage device 1606 also stores the content DB 513.

The computer programs and the data stored in the external storage device 1606 are appropriately loaded into the RAM 1602 according to control of the CPU 1601 and processed by the CPU 1601.

The I/F 1607 is a communication interface for communicating data with the HMD 101 and functions as the I/F 510. That is, the image processing apparatus 104 communicates data with the HMD 101 via the I/F 1607.

Figure 16B:
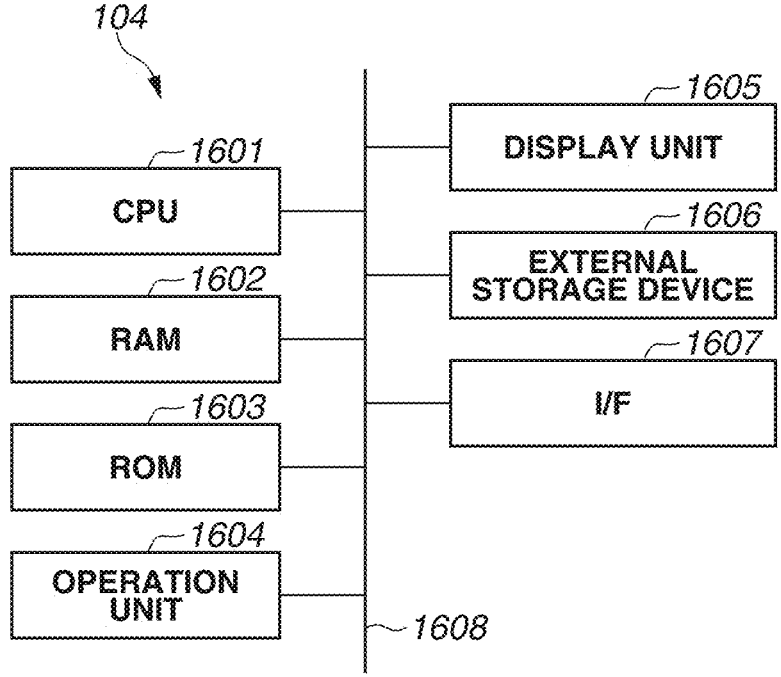
FIG. 16B is a block diagram illustrating an example of a hardware configuration of a computer apparatus.

The CPU 1601, the RAM 1602, the ROM 1603, the operation unit 1604, the display unit 1605, the external storage device 1606, and the I/F 1607 are each connected to the bus 1608. The configuration illustrated in FIG. 16B is an example of a configuration applicable to the image processing apparatus 104, and can be appropriately changed and modified.

A fifth exemplary embodiment will be described. In the above exemplary embodiments, the marker 202 artificially placed in the real space is used to obtain the position and orientation of each imaging unit. In addition to or instead of the marker 202, the position and orientation of an imaging unit, however, may be obtained using a natural feature inherently present in the real space (e.g., a corner of a piece of furniture, such as a chair or a desk, or a corner of a building or a vehicle included in a scenery).

The configuration of the MR system 100 illustrated in FIG. 5 or 13 is merely an example. For example, the processes performed by the HMD 101 in the above description may be performed by a plurality of apparatuses in a shared manner, or the processes performed by the image processing apparatus 104 in the above description may be performed by a plurality of apparatuses in a shared manner.

Instead of a head-mounted display apparatus, "a portable device including a plurality of imaging units using different shutter methods, the orientation sensor 503, and the display unit 504", such as a smartphone, may be used. Alternatively, in addition to a head-mounted display apparatus, such a portable device may be added to the MR system 100. In such a case, the image processing apparatus 104 generates an image of the mixed reality space according to the position and orientation of the head-mounted display apparatus, delivers the image of the mixed reality space to the head-mounted display apparatus, generates an image of the mixed reality space according to the position and orientation of the portable device, and delivers the image of the mixed reality space to the portable device. The method for generating the images of the mixed reality space is as illustrated in the above exemplary embodiments.

The HMD 101 and the image processing apparatus 104 may be integrated together, or instead of a head-mounted display apparatus, the above portable device may be integrated with the image processing apparatus 104.

The above exemplary embodiments have been described on the premise that the HMD 101 includes the orientation sensor 503. The present disclosure, however, is not so limited. For example, a configuration may be employed in which necessary information is obtained from a captured image captured by an objective camera installed near the wearer of the HMD 101.

The numerical values, the calculation methods, and the execution timings of the processes used in the above exemplary embodiments are merely examples for specific descriptions, and are not intended to limit the exemplary embodiments to these examples.

Some or all of the above exemplary embodiments may be used in appropriate combination. Alternatively, some or all of the above exemplary embodiments may be selectively used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-195010, filed Dec. 6, 2022, which is hereby incorporated by reference herein in its entirety.

What is claimed is:

1. A head-mounted display apparatus comprising:
a display unit;
a first imaging unit;
a second imaging unit; and
a generation unit configured to, based on a signal indicating an image input timing of input of an image to the display unit, generate a first signal for controlling a start of exposure of the first imaging unit and a second signal for controlling a start of exposure of the second imaging unit,
wherein the generation unit adjusts the generation timing of the first and second signals so that a predetermined time within respective exposure periods of the first and second imaging units substantially coincides with the image input timing of the display unit.

2. The head-mounted display apparatus according to claim 1, wherein the generation unit generates the first and second signals so that a first time in an exposure time of the first imaging unit and a second time in an exposure time of the second imaging unit coincide with each other.

3. The head-mounted display apparatus according to claim 1, wherein in a case where an exposure time of the first imaging unit or an exposure time of the second imaging unit is correspondingly adjusted, the generation unit changes a generation timing of the first or second signal so that a first time in the exposure time of the first imaging unit and a second time in the exposure time of the second imaging unit coincide with each other.

4. The head-mounted display apparatus according to claim 1, wherein in a case where processing times of images captured by the first and second imaging units vary between frames, the generation unit changes a generation timing of the first or second signal.

5. The head-mounted display apparatus according to claim 1, further comprising an identifying unit configured to identify a region of interest in an imaging range of the first imaging unit.

6. The head-mounted display apparatus according to claim 5, wherein the identifying unit is a first detection unit configured to detect a line-of-sight position of a wearer of the head-mounted display apparatus in the imaging range of the first imaging unit and identifies the line-of-sight position as the region of interest.

7. The head-mounted display apparatus according to claim 6, wherein based on the signal indicating the image input timing of the input of the image to the display unit, the generation unit generates a fourth signal for controlling an acquisition timing of the line-of-sight position detected by the first detection unit.

8. The head-mounted display apparatus according to claim 7, wherein the generation unit generates the first, second, and fourth signals so that a first time in an exposure time of the first imaging unit, a second time in an exposure time of the second imaging unit, and the acquisition timing of the line-of-sight position detected by the first detection unit coincide with each other.

9. The head-mounted display apparatus according to claim 5, wherein a first time in an exposure time of the first imaging unit is set based on the region of interest in the imaging range of the first imaging unit.

10. The head-mounted display apparatus according to claim 5,
wherein the display unit displays a combined image of an image captured by the first imaging unit and an image of a virtual space based on an image captured by the second imaging unit and a position and orientation detected by a second detection unit, and
wherein the identifying unit identifies the region of interest based on a drawing position of a virtual object included in the image of the virtual space.

11. The head-mounted display apparatus according to claim 5, wherein the identifying unit identifies the region of interest based on extraction information regarding a feature extracted from an image captured by the second imaging unit.

12. The head-mounted display apparatus according to claim 11, wherein the extracted feature is a marker.

13. The head-mounted display apparatus according to claim 1, further comprising a second detection unit configured to detect a position and orientation of the head-mounted display apparatus,
wherein based on the signal indicating the image input timing of the input of the image to the display unit, the generation unit generates a third signal for controlling an acquisition timing of the position and orientation detected by the second detection unit.

14. The head-mounted display apparatus according to claim 13, wherein the generation unit generates the first, second, and third signals so that a first time in an exposure time of the first imaging unit, a second time in an exposure time of the second imaging unit, and the acquisition timing of the position and orientation detected by the second detection unit coincide with each other.

15. The head-mounted display apparatus according to claim 13, wherein the display unit displays a combined image of an image captured by the first imaging unit and an image of a virtual space based on an image captured by the second imaging unit and the position and orientation detected by the second detection unit.

16. The head-mounted display apparatus according to claim 1, wherein the first imaging unit captures an image using a first shutter method, and the second imaging unit captures an image using a second shutter method different from the first shutter method.

17. The head-mounted display apparatus according to claim 16,
wherein the first shutter method is a rolling shutter method, and
wherein the second shutter method is a global shutter method.

18. The head-mounted display apparatus according to claim 1, wherein the display unit displays a combined image of an image captured by the first imaging unit and an image of a virtual space based on an image captured by the second imaging unit.

19. A system comprising:
a head-mounted display apparatus; and
an image processing apparatus,
the head-mounted display apparatus comprising:
a display unit;
a first imaging unit;

a second imaging unit; and a generation unit configured to, based on a signal indicating an image input timing of input of an image to the display unit, generate a first signal for controlling a start of exposure of the first imaging unit and a second signal for controlling a start of exposure of the second imaging unit, wherein the generation unit adjusts the generation timing of the first and second signals so that a predetermined time within respective exposure periods of the first and second imaging units substantially coincides with the image input timing of the display unit, the image processing apparatus comprising:

a combining unit configured to generate an image of a virtual space based on an image captured by the second imaging unit and generate a combined image obtained by combining the image of the virtual space and an image captured by the first imaging unit; and a transmission unit configured to transmit the combined image and the signal indicating the image input timing to the head-mounted display apparatus, wherein the display unit displays the combined image.

20. A control method for a head-mounted display apparatus including a display unit, a first imaging unit, and a second imaging unit, the control method comprising, based on a signal indicating an image input timing of input of an image to the display unit, generating a first signal for controlling a start of exposure of the first imaging unit and a second signal for controlling a start of exposure of the second imaging unit, wherein the generating adjusts the generation timing of the first and second signals so that a predetermined time within respective exposure periods of the first and second imaging units substantially coincides with the image input timing of the display unit.

\* \* \* \* \*